US012767462B2

(12) United States Patent
Hara et al.

(10) Patent No.: US 12,767,462 B2
(45) Date of Patent: Oct. 20, 2026

(54) TRANSFER APPARATUS, CONTROL DEVICE, TRANSFER METHOD, AND STORAGE MEDIUM

(71) Applicant: KABUSHIKI KAISHA TOSHIBA, Tokyo (JP)

(72) Inventors: Naoyuki Hara, Kawasaki (JP); Atsushi Sugahara, Kawasaki (JP); Takafumi Ushiyama, Sagamihara (JP); Motojiro Shibata, Yokohama (JP); Yukihiro Ikeya, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 982 days.

(21) Appl. No.: 18/051,585

(22) Filed: Nov. 1, 2022

(65) Prior Publication Data

US 2023/0136488 A1 May 4, 2023

(30) Foreign Application Priority Data

Nov. 2, 2021 (JP) ................................ 2021-179610

(51) Int. Cl.

*B65G 43/08* (2006.01)
*B65G 41/00* (2006.01)
*B65G 47/91* (2006.01)

(52) U.S. Cl.

CPC ......... *B65G 47/912* (2013.01); *B65G 41/003* (2013.01); *B65G 43/08* (2013.01); *B65G 2203/0233* (2013.01)

(58) Field of Classification Search

CPC .... B65G 47/912; B65G 41/003; B65G 43/08; B65G 59/04; B65G 23/22; B65G 23/04;

(Continued)

(56) References Cited

U.S. PATENT DOCUMENTS 6,652,014 B2 * 11/2003 Schmalz .............. B25J 15/0616 414/737
8,473,094 B2 * 6/2013 Becker ................. B65G 47/918 414/796

(Continued)

FOREIGN PATENT DOCUMENTS

CN 109015736 A 12/2018
EP 3 508 314 A1 7/2019

(Continued)

OTHER PUBLICATIONS

Japanese Office Action issued Aug. 20, 2025 in Japanese Patent Application No. 2021-179610 (with unedited computer-generated English Translation), 12 pages.

(Continued)

*Primary Examiner* — Patrick H Mackey
(74) *Attorney, Agent, or Firm* — Oblon, McClelland, Maier & Neustadt, L.L.P.

(57) ABSTRACT

According to one embodiment, a transfer apparatus includes a suction hand, a moving device, a first detector, and a controller. The suction hand includes a first and second suction units. The first and second suction units are configured to contact with an article in a first direction and a second direction, respectively. the first suction unit and the second suction unit each are provided multiply in a third direction. The controller performs at least a first operation and a second operation. In the first operation, the first suction units respectively suction first surfaces of the articles, the second suction units respectively suction second surfaces of the articles, and the articles are moved. In the second operation, one of the first suction units suctions the first surface of one of the articles, the second suction units do not suction the articles, and the one of the articles is moved.

17 Claims, 30 Drawing Sheets

(58) Field of Classification Search
CPC .. B65G 47/918; B65G 47/917; B25J 15/0616; B25J 9/1687; B25J 9/1612
See application file for complete search history.

(56) References Cited

U.S. PATENT DOCUMENTS

| | | | | |
|---|---|---|---|---|
| 9,498,887 | B1 * | 11/2016 | Zevenbergen | B25J 15/0052 |
| 2010/0239408 | A1 | 9/2010 | Becker et al. | |
| 2018/0072512 | A1 | 3/2018 | Sonoura et al. | |
| 2018/0297200 | A1 * | 10/2018 | Nakayama | B25J 9/1612 |
| 2020/0180875 | A1 | 6/2020 | Yabe | |
| 2021/0101760 | A1 * | 4/2021 | Yabe | B25J 15/06 |

FOREIGN PATENT DOCUMENTS

| | | | | | |
|---|---|---|---|---|---|
| EP | 4 144 674 | A1 | | 3/2023 | |
| JP | 2010-188483 | A | | 9/2010 | |
| JP | 2018-43853 | A | | 3/2018 | |
| JP | 2018-176348 | A | | 11/2018 | |
| JP | 2019218165 | A | * | 12/2019 | B65G 59/04 |
| JP | 2021-160857 | A | | 10/2021 | |
| JP | 2022-134883 | A | | 9/2022 | |
| WO | WO 2019/049772 | A1 | | 3/2019 | |
| WO | WO 2020/054771 | A1 | | 3/2020 | |

OTHER PUBLICATIONS

Combined Chinese Office Action and Search Report issued Dec. 27, 2025 in Chinese Patent Application No. 202211362338.2 (with unedited computer-generated English Translation), 19 pages.

* cited by examiner

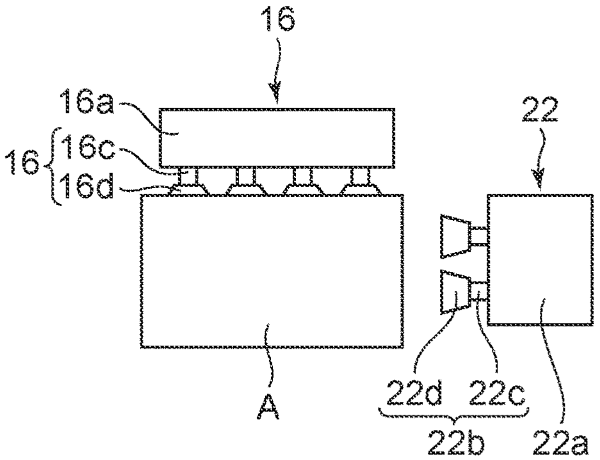
FIG. 8A
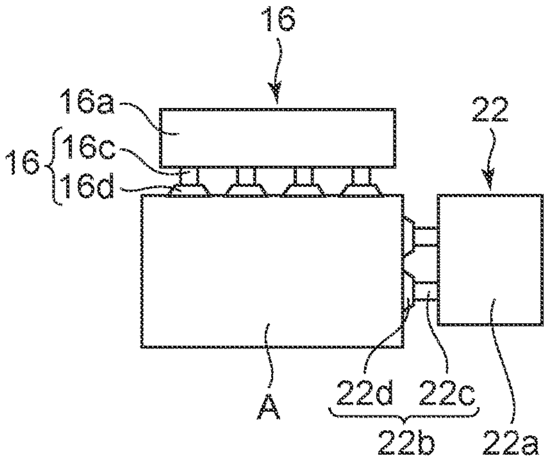
FIG. 8B
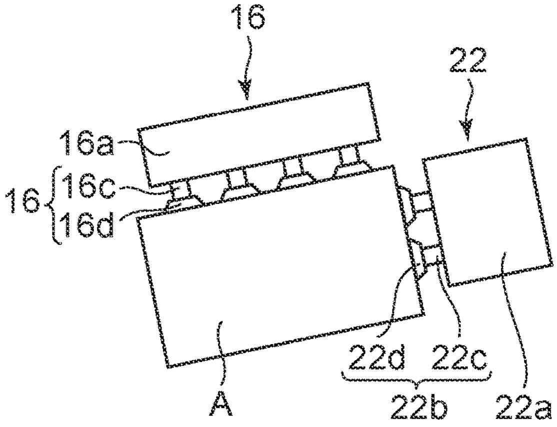
FIG. 8C
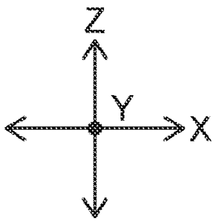

TRANSFER APPARATUS, CONTROL DEVICE, TRANSFER METHOD, AND STORAGE MEDIUM

CROSS-REFERENCE TO RELATED APPLICATIONS

This application is based upon and claims the benefit of priority from Japanese Patent Application No. 2021-179610, filed on Nov. 2, 2021; the entire contents of which are incorporated herein by reference.

FIELD

Embodiments described below relate to a transfer apparatus, a control device, a transfer method, program, and a storage medium.

BACKGROUND

There is a transfer apparatus for transferring articles. Improvements in work efficiency are required for the transfer apparatus.

BRIEF DESCRIPTION OF THE DRAWINGS

FIGS. 8A to 8C are side views schematically showing states when the article is held in the first operation;

DETAILED DESCRIPTION

According to one embodiment, a transfer apparatus includes a suction hand, a moving device, a first detector, and a controller. The suction hand includes a first suction unit and a second suction unit. The first suction unit includes a plurality of first suction portions and is configured to contact with an article in a first direction. The second suction unit includes a plurality of second suction portions and is configured to contact with the article in a second direction crossing the first direction. the first suction unit and the second suction unit each are provided multiply in a third direction crossing a first plane parallel to the first direction and the second direction. The moving device moves the suction hand. The first detector detects a first surface and a second surface of the article. The first surface crosses the first direction. The second surface crosses the second direction. The controller controls the suction hand and the moving device based on a first detection result from the first detector. The controller performs at least a first operation and a second operation. The first operation causes a plurality of the first suction units to respectively suction a plurality of the first surfaces of a plurality of the articles. The first operation further causes a plurality of the second suction units to respectively suction a plurality of the second surfaces of the articles. The first operation moves the articles. The first operation is performed in a case where a placement state of the articles calculated using the first detection result satisfies a first condition. The second operation causes one of the first suction units to suction the first surface of one of the articles. The second operation does not cause the second suction units to suction the articles. The second operation moves the one of the articles. The second operation is performed in a case where the placement state satisfies a second condition.

Figure 1:
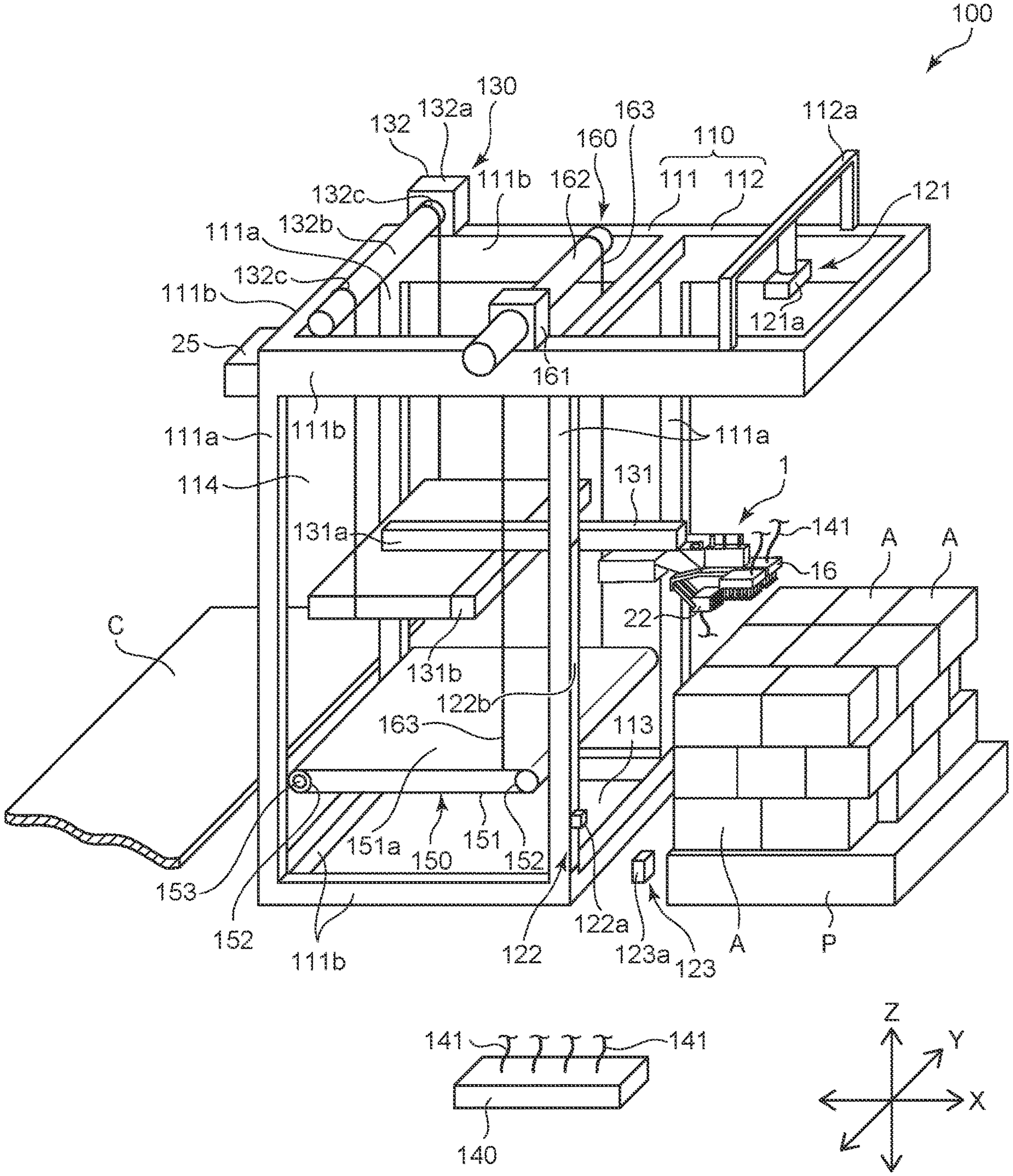
FIG. 1 is a perspective view schematically showing a transfer apparatus according to an embodiment.

FIG. 1 is a perspective view schematically showing a transfer apparatus according to an embodiment.

The transfer apparatus 100 according to the embodiment is installed at a site where an article transfer operation is performed, such as a warehouse. In the transfer operation, the loaded articles are sequentially moved to a carrier device or another position. As shown in FIG. 1, the transfer apparatus 100 includes a suction hand 1, a controller 25, a support frame 110, a first detector 121, a second detector 122, a third detector 123, a moving device 130, and a negative pressure generator 140.

The suction hand 1 can suction an upper surface (first surface) and a side surface (second surface) of an article by vacuum. The suction hand 1 can hold (stably grip) the article by suctioning at least one of the upper surface and the side surface of the article.

Specifically, the suction hand 1 includes an upper surface suction unit 16 and a side surface suction unit 22. Here, a direction of which the upper surface suction unit 16 is in contact with the article A is taken as Z-direction (up-down direction or a first direction). A direction of which the side surface suction unit 22 is in contact with the article A is taken as X-direction (front-rear direction or second direction). A direction crossing X-Z surface is taken as Y-direction (left-right direction or third direction). For example, the X-direction and the Y-direction are parallel to the horizontal plane and the Z-direction is parallel to the vertical direction. The X-direction, the Y-direction, and the Z-direction may be orthogonal to each other.

The support frame 110 supports each component of transfer apparatus 100. The first detector 121 detects the upper surface and the side surface of the article A. The second detector 122 detects the height of the article A and the like. The side surface specifically refers to a surface that crosses the X-direction and faces the conveyor 150 among the multiple surfaces of the article A. The third detector 123 detects the position of the bottom surface of the article A held by the suction hand 1. The moving device 130 moves the suction hand 1. The negative pressure generator 140 generates negative pressure in the suction hand 1 for suction.

The transfer apparatus 100 may further include a conveyor 150 and a lifting-and-lowering device 160 for cargo-handling operations. In other words, the transfer apparatus 100 may be used as a cargo-handling apparatus. For example, the cargo-handling operation includes unloading and loading. As an example, the pallet P on which the article A is loaded is placed adjacent to the transfer apparatus 100. The transfer apparatus 100 is located between the conveyor C and the pallet P. The transfer apparatus 100 holds the article A loaded on the pallet P, and transfers to the conveyor 150 in the support frame 110. The conveyor 150 further conveys the transferred article A toward the conveyor C. The lifting-and-lowering device 160 lifts or lowers the conveyor 150.

A specific example of each component will be described in detail below.

The support frame 110 constitutes the outline of the transfer apparatus 100 and is fixed to the floor surface. The support frame 110 includes a main body 111 and a protruding portion 112. The shape of the main body 111 is a rectangular parallelepiped. The conveyor 150 is provided inside the main body 111. The main body 111 has an opening 113 facing the pallet P side and an opening 114 facing the conveyor C side. The article A is transferred from pallet P to conveyor 150 through opening 113. Also, the article A is transferred from the conveyor 150 to the conveyor C through the opening 114.

The main body 111 is composed of, for example, four vertical frames 111*a* and multiple horizontal frames 111*b* connecting the upper ends and the lower ends of the four vertical frames 111*a*. The protruding portion 112 is attached to the front of the upper portion of the main body 111 and protrudes forward. The protruding portion 112 is positioned above the pallet P.

The first detector 121 detects the upper surface and the side surface of the article from the Z-direction. The first detector 121 includes an imager 121*a*. The imager 121*a* is fixed to a support portion 112*a* provided on the protruding portion 112. The imager 121*a* includes one or two selected from an image sensor and a distance measuring sensor. The imager 121*a* images the article A placed on the pallet P from above. The imager 121*a* transmits the acquired image (still image) to the controller 25. The imager 121*a* may acquire a moving image. In this case, a still image is cut out from the moving image.

The controller 25 calculates data related to the article from the image acquired by the imager 121*a*. The calculated data includes the recognition result of the upper surface of the article A in the image, the position of the upper surface in each of the X-direction, the Y-direction, and the Z-direction, the length of the upper surface in the X-direction, the length of the upper surface in the Y-direction, the area of the upper surface, etc. In the transfer apparatus 100, the imager 121*a* and the controller 25 function as the first detector 121 for detecting the upper surface of the article A. An image recognition system other than the controller 25 may be incorporated into the imager 121*a* and it may be used as the first detector 121.

The second detector 122 detects the side surface of the article in a direction crossing the Z-direction. The second detector 122 includes a distance measuring sensor 122*a*. The distance measuring sensor 122*a* measures the distance to the article in a direction crossing the Z-direction. In the illustrated example, the distance measuring sensor 122*a* is provided on one of the multiple vertical frames 111*a*, and measures the distance to the article from a direction perpendicular to the Z-direction and inclined from the X-direction and the Y-direction. The distance measuring sensor 122*a* emits infrared rays, laser beams, or ultrasonic waves toward the article. From the viewpoint of distance measurement accuracy, the distance measuring sensor 122*a* is preferably a laser range finder (LRF) using a laser beam.

The controller 25 recognizes the side surface of the article A and calculates the position of the side surface of the article A in the X-Y plane based on the measurement result of the distance measuring sensor 122*a*. The distance measuring sensor 122*a* and the controller 25 function as the second detector 122.

For example, the second detector 122 is attached to the lifting-and-lowering device 122*b*. The lifting-and-lowering device 122*b* lifts or lowers the second detector 122 along the Z-direction. In this case, the controller 25 can calculate the position of the bottom surface of the article A in the Z-direction, the position of the upper surface of the article A in the Z-direction, and the height (length in the Z-direction) of the article A from the measurement result by the distance measuring sensor 122*a* and the movement amount of the lifting-and-lowering device 122*b*.

Similarly to the first detector 121, the second detector 122 may include an imager. The imager images the article A placed on the pallet P from the side. The imager transmits the acquired image to the controller 25. The controller 25 calculates a recognition result of the side surface of the article A, the position of the side surface of the article A in the X-Y plane, the position of the bottom surface of the article A in the Z-direction, the position of the upper surface of the article A in the Z-direction, the height of the article A, etc., from the image. That is, the imager and the controller 25 function as the second detector 122.

The third detector 123 may include a distance measuring sensor 123*a* installed between the main body 111 and the pallet P. The distance measuring sensor 123*a* detects the position in the Z-direction of the bottom surface of the article A passing above. The distance measuring sensor 123*a* transmits the measurement result to the controller 25. The controller 25 calculates the position of the bottom surface of the article A in the Z-direction from the measurement result of the distance measuring sensor 123*a*. The distance measuring sensor 123*a* and the controller 25 function as the third detector 123. The distance measuring sensor 123*a* is preferably a LRF using laser light.

Similarly to the first detector 121, the third detector 123 may include an imager. The imager is installed between the main body 111 and the pallet P, and images the article A passing above from below. The imager transmits the acquired image to the controller 25. The controller 25 calculates the position of the bottom surface of the article A in the Z-direction from the image. That is, the imager and the controller 25 function as the third detector 123.

The moving device 130 includes a horizontal moving device 131 and a lifting-and-lowering device 132. The horizontal moving device 131 moves the suction hand 1 along the X-Y plane. The lifting-and-lowering device 132 lifts or lowers the horizontal moving device 131. Thus, the suction hand 1 connected to the horizontal moving device 131 moves along the Z-direction.

The horizontal moving device 131 includes an arm 131*a* and a support portion 131*b*. The arm 131*a* is connected to the arm 10 of the suction hand 1 and can extend and contract in the X-direction. By the operation of the arm 131*a*, the suction hand 1 can be moved along the X-direction. The support portion 131*b* extends in the Y-direction and supports the arm 131*a* from below so that it enables to move. The support portion 131*b* moves the arm 131*a* along the Y-direction. The suction hand 1 can be moved along the Y-direction by the operation of the support portion 131*b*. The arm 131*a* and the support portion 131*b* are respectively operated by an actuator such as a motor or an air cylinder.

The lifting-and-lowering device 132 includes a drive unit 132*a*, a shaft 132*b*, and a wire 132*c*. The drive unit 132*a* is attached to the upper end of the main body 111. The shaft 132*b* extends along the Y-direction and is connected to the drive unit 132*a*. The wire 132*c* is wound around shaft 132*b*. One end of the wire 132*c* is connected to the horizontal moving device 131. The drive unit 132*a* rotates the shaft 132*b*. The wire 132*c* is wound or unwound according to the rotation of the shaft 132*b*, thereby the horizontal moving device 131 moves along the Z-direction.

The negative pressure generator 140 can individually adjust the pressure of each upper surface suction unit 16 and the pressure of each side surface suction unit 22. The negative pressure generator 140 includes multiple pipes 141 respectively connected with the multiple upper surface suction units 16 and the multiple side surface suction units 22. In addition, the negative pressure generator 140 includes a vacuum pump, an ejector, a valve, etc. (not shown).

The conveyor 150 includes a belt 151, a pulley 152, and a motor 153. The belt 151 is an endless belt hung on a pair of pulleys 152 separated from each other in the X-direction. One end of the belt 151 is adjacent to the conveyor C. The rotation axis of the pulley 152 is parallel to the Y-direction. The motor 153 drives the belt 151 by rotating one of the pair of pulleys 152. The article A placed on the conveyor 150 is conveyed toward the conveyor C by driving the belt 151.

The lifting-and-lowering device 160 includes a drive unit 161, a shaft 162, and a wire 163. The drive unit 161 is attached to the upper end of the main body 111. The shaft 162 extends in the Y-direction and is connected to the drive unit 161. The wire 163 is wound around the shaft 162. One end of the wire 163 is connected to the conveyor 150. The drive unit 161 rotates the shaft 162. The wire 163 is wound or unwound according to the rotation of the shaft 162, thereby the conveyor 150 moves along the Z-direction.

The controller 25 controls the operation of the above-described components. For example, the controller 25 is electrically connected to the suction hand 1, the imager 121*a*, the distance measuring sensor 122*a*, the distance measuring sensor 123*a*, the moving device 130, the negative pressure generator 140, the conveyor 150, and the lifting-and-lowering device 160. The controller 25 controls the suction hand 1, the moving device 130, the negative pressure generator 140, the conveyor 150, the lifting-and-lowering device 160, etc., based on the detection result (first detection result) by the first detector 121, the detection result (second detection result) by the second detector 122, and the detection result by the third detector 123.

Figure 2:
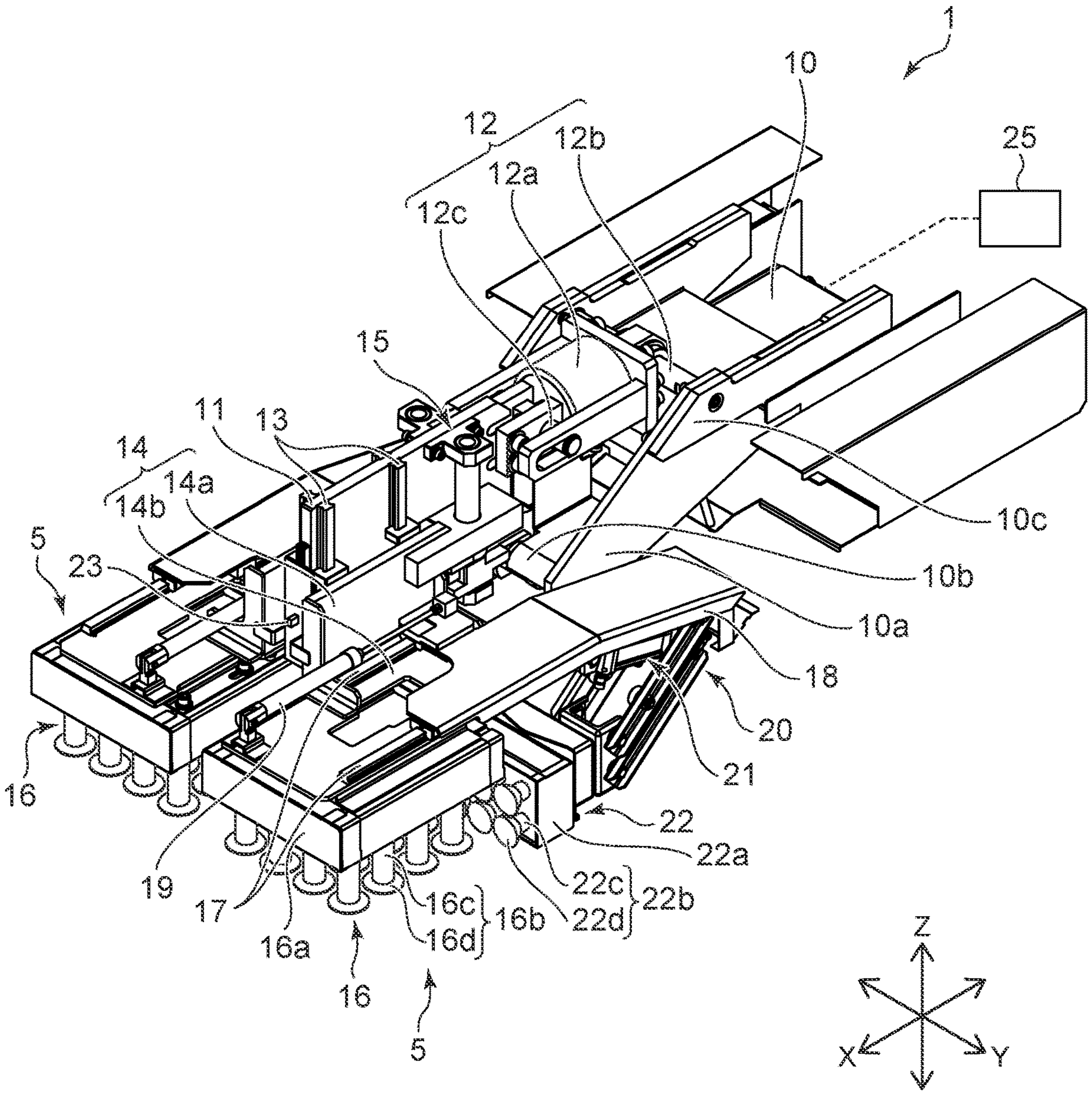
FIG. 2 is a perspective view showing a suction hand according to the embodiment.
Figure 3:
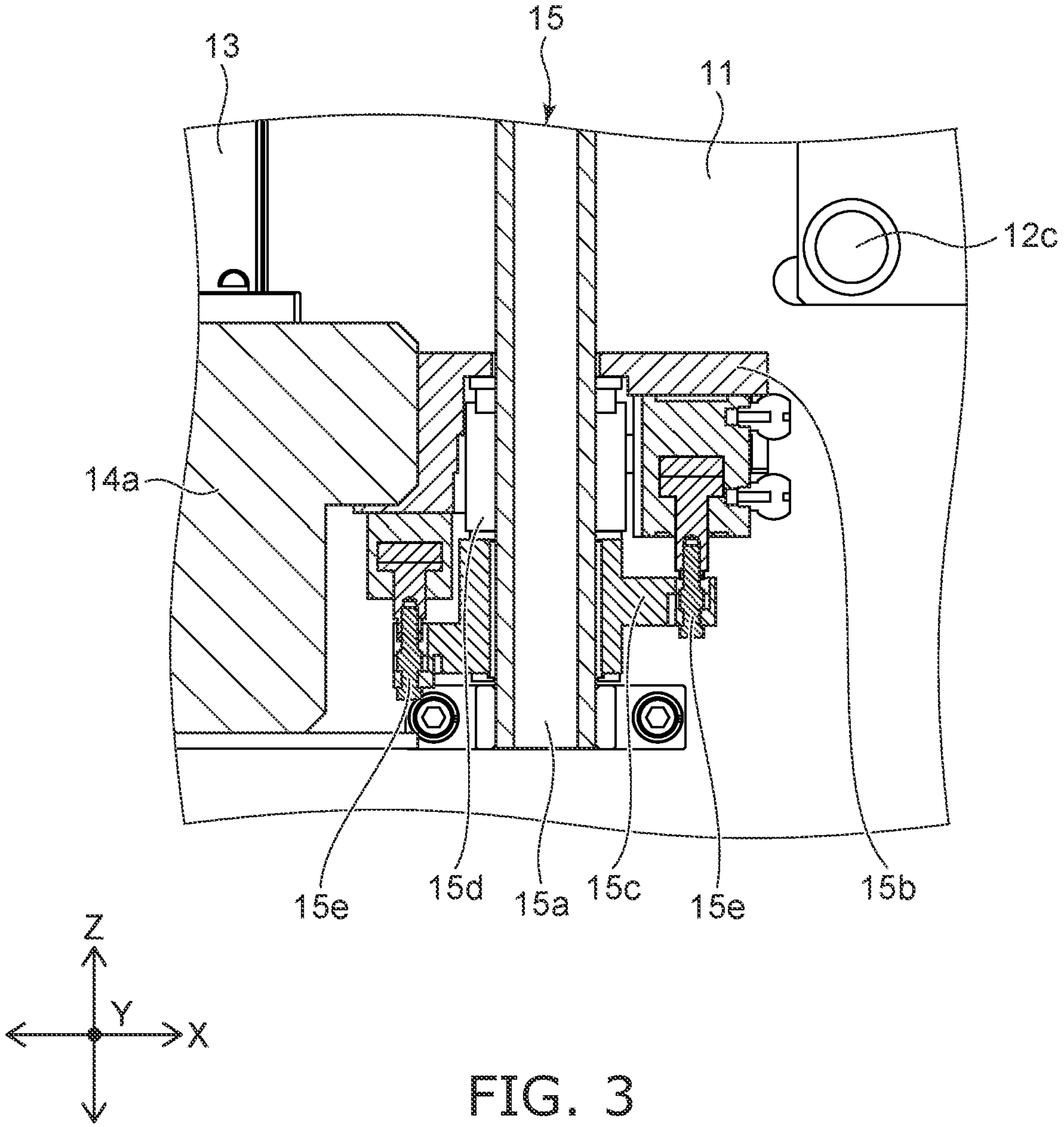
FIG. 3 is a cross-sectional view showing a part of the suction hand according to the embodiment.
Figure 4:
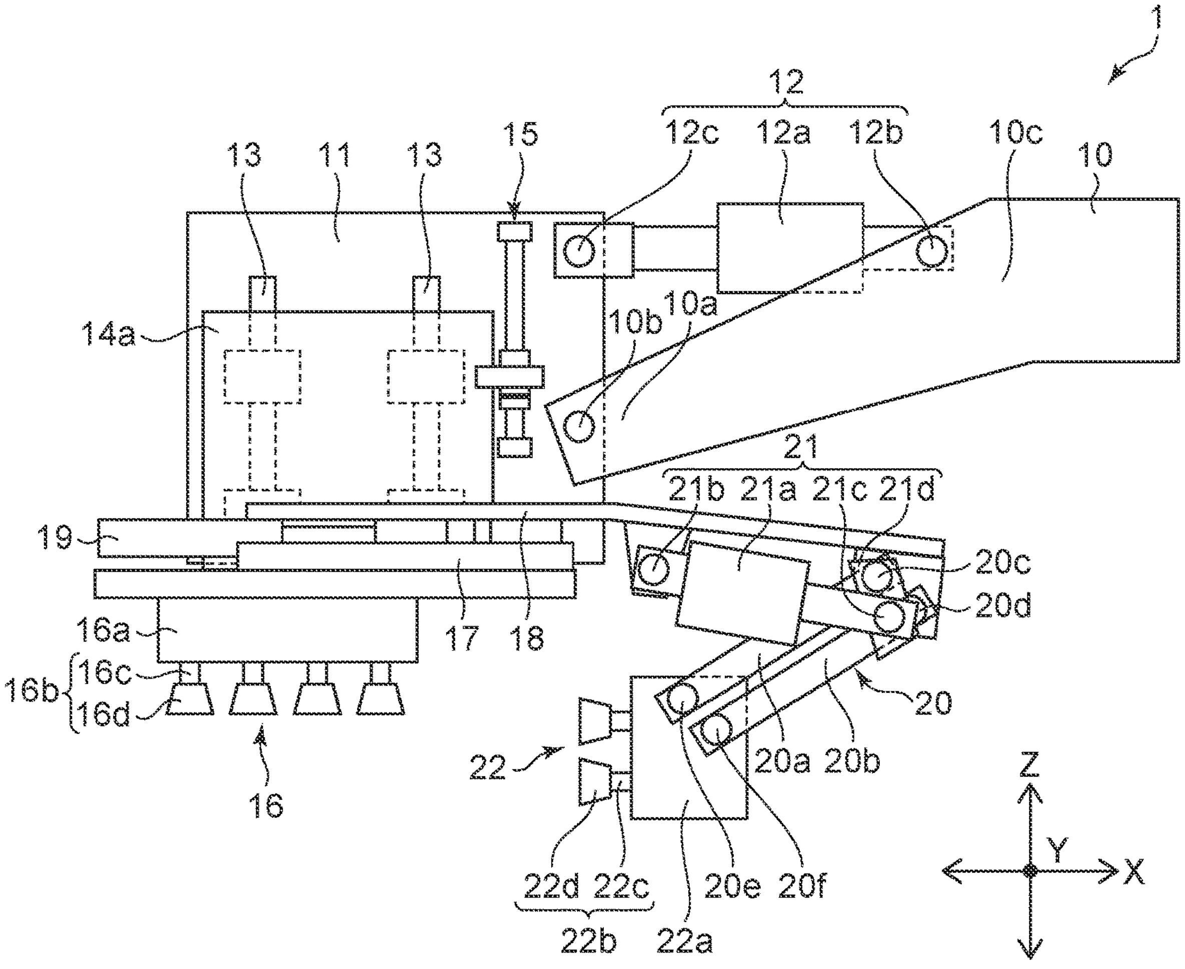
FIG. 4 is a side view schematically showing the suction hand according to the embodiment.

FIG. 2 is a perspective view showing the suction hand according to the embodiment. FIG. 3 is a cross-sectional view showing a part of the suction hand according to the embodiment. FIG. 4 is a side view schematically showing the suction hand according to the embodiment.

A specific example of the suction hand 1 according to the embodiment will be described with reference to FIGS. 2 to 4. As shown in FIGS. 2 to 4, the suction hand 1 includes an arm 10, a base 11, an inclination mechanism 12, a linear guide 13, a connection frame 14, a fixing mechanism 15, an upper surface suction unit 16 (a first suction unit), a linear guide 17, a connection plate 18, a cylinder 19, a link mechanism 20, a drive mechanism 21, a side surface suction unit 22 (a second suction unit), and a detector 23.

As shown in FIG. 2, the arm 10 extends along the X-direction and supports each constituent element of the suction hand 1. The arm 10 is connected to an external device such as an X-Y orthogonal robot. The arm 10 may also be a part of the external device.

The base 11 is a plate-shaped member extending along an X-Z plane. A rear end of a lower portion of the base 11 is connected to a tip end 10*a* of the arm 10 via a rotation shaft 10*b*, and is rotatable with respect to the tip end 10*a*.

The inclination mechanism 12 is provided between the arm 10 and the base 11. Specifically, the inclination mechanism 12 includes a cylinder 12*a*, a rotation shaft 12*b*, and a rotation shaft 12*c*. The arm 10 includes a bent portion 10*c* that is bent downward. One end of the cylinder 12*a* is connected to the bent portion 10*c* via the rotation shaft 12*b*, and is rotatable with respect to the bent portion 10*c*. The other end of the cylinder 12*a* is connected to a rear end of an upper portion of the base 11 via the rotation shaft 12*c*, and is rotatable with respect to the rear end. Rotation centers of the rotation shafts 10*b*, 12*b*, and 12*c* are parallel to the Y-direction.

The cylinder 12*a* can extend and contract along the X-direction. A positions in the Z-direction of the cylinder 12*a*, the rotation shaft 12*b*, and the rotation shaft 12*c* are different from a position in the Z-direction of the rotation shaft 10*b*. Accordingly, when a length of the cylinder 12*a* changes, an angle of the base 11 around the Y-direction changes. In the suction hand 1, the cylinder 12*a*, the rotation shaft 12*b*, and the rotation shaft 12*c* are located above the rotation shaft 10*b*. For example, as the cylinder 12*a* extends, a front end of the base 11 is inclined downward.

The linear guide 13 is provided on a side surface of the base 11. In the suction hand 1, two linear guides 13 are provided on one side surface of the base 11. The linear guide 13 includes a rail and a block. The rail is fixed to the base 11 and is provided along the Z-direction. The block is movable in the Z-direction along the rail.

The connection frame 14 includes a vertical frame portion 14*a* extending along the X-Z plane and a horizontal frame portion 14*b* extending along the X-Y plane. One end of the horizontal frame portion 14*b* in the Y-direction is connected to a lower end of the vertical frame portion 14*a*. The vertical frame portion 14*a* is fixed to the block of the linear guide 13. Accordingly, the connection frame 14 is movable in the Z-direction with respect to the base 11.

The fixing mechanism 15 is provided on the side surface of the base 11 so as to be close to the vertical frame portion 14*a*. The fixing mechanism 15 can switch between a locked state in which the connection frame 14 is fixed and an unlocked state in which the connection frame 14 is movable. FIG. 3 shows an X-Z cross section passing through the fixing mechanism 15. As shown in FIG. 3, the fixing mechanism 15 includes a rod 15*a*, a fixed plate 15*b*, a movable plate 15*c*, a clamper 15*d*, and a cylinder 15*e*.

The rod 15*a* is fixed to the base 11 and extends along the Z-direction. The fixed plate 15*b* is a plate-shaped member extending along the X-Y plane, and is fixed to the connection frame 14. The movable plate 15*c* is a plate-shaped member extending along the X-Y plane, and is attached to the fixed plate 15*b* via the clamper 15*d* and the cylinder 15*e*. In the unlocked state, the fixed plate 15*b*, the movable plate 15*c*, the clamper 15*d*, and the cylinder 15*e* are slidable with respect to the rod 15*a*. When the connection frame 14 moves along the Z-direction, the fixed plate 15*b*, the movable plate 15*c*, the clamper 15*d*, and the cylinder 15*e* also move along the Z-direction.

The cylinder 15*e* can extend and contract along the Z-direction. When the cylinder 15*e* extends or contracts, the movable plate 15*c* moves in the Z-direction with respect to the fixed plate 15*b*. When a distance between the fixed plate 15*b* and the movable plate 15*c* is increased by the operation of the cylinder 15*e*, a component of the clamper 15*d* is pressed toward the rod 15*a*. Accordingly, positions of the fixed plate 15*b*, the movable plate 15*c*, the clamper 15*d*, and the cylinder 15*e* in the Z-direction are fixed. As a result, a position of the connection frame 14 in the Z-direction is fixed. When the distance between the fixed plate 15*b* and the movable plate 15*c* is decreased, the pressing of the component of the clamper 15*d* toward the rod 15*a* is released. Accordingly, the fixed plate 15*b*, the movable plate 15*c*, the clamper 15*d*, and the cylinder 15*e* are movable. As a result, the connection frame 14 is movable in the Z-direction.

As shown in FIG. 2, the upper surface suction unit 16 is fixed to the horizontal frame portion 14*b* of the connection frame 14. The upper surface suction unit 16 includes a housing 16*a* and multiple suction portions 16*b* (first suction portions). Each suction portion 16*b* includes a rod 16*c* (first rod) and a suction pad 16*d* (first suction pad). The rod 16*c* extends along the Z-direction. For example, the rod 16*c* is fixed to the housing 16*a*. The rod 16*c* may also be slidable in the Z-direction with respect to the housing 16*a*. In this case, the upper surface suction unit 16 is further provided with a clamper configured to fix the rod 16*c*. The suction pad 16*d* has flexibility and is provided at a tip end of the rod 16*c*. Spaces are provided inside the rod 16*c* and inside the suction pad 16*d*, and these spaces communicate with each other.

The multiple suction portions 16*b* are arranged along two directions crossing each other. A suction face of the suction pad 16*d* is parallel to a direction in which the multiple suction portions 16*b* are arranged. In the suction hand 1, the multiple suction portions 16*b* are arranged along the X-direction and the Y-direction. The number of the suction portions 16*b*, a size of each suction portion 16*b*, an interval between the suction portions 16*b*, and the like are appropriately designed according to an article to be held.

A pipe or the like configured to connect an exhaust system (not shown) and the multiple suction portions 16*b* is provided inside the housing 16*a*. By an operation of the exhaust system, the inside of each suction pad 16*d* is collectively depressurized for one upper surface suction unit 16.

The linear guide 17 is provided along an upper surface of the housing 16*a*. In the suction hand 1, one linear guide 17 is provided on the upper surface of the housing 16*a*, and another linear guide 17 is provided on an upper surface of the horizontal frame portion 14*b*. Each linear guide 17 includes a rail and a block. The rail is fixed to the horizontal frame portion 14*b* and the housing 16*a*, and extends along the X-direction. The block is movable in the X-direction along the rail.

The connection plate 18 is a plate-shaped member extending along the X-direction. A front portion of the connection plate 18 is parallel to the X-Y plane and is fixed to the block of each linear guide 17. Accordingly, the connection plate 18 is movable in the X-direction with respect to the upper surface suction unit 16. A rear portion of the connection plate 18 is slightly inclined downward.

The cylinder 19 moves the side surface suction unit 22 in the X-direction with respect to the upper surface suction unit 16. Specifically, as shown in FIG. 2 and FIG. 4, a tube body of the cylinder 19 is fixed to the housing 16*a*. A piston of the cylinder 19 is fixed to the connection plate 18. The cylinder 19 can extend and contract along the X-direction. When the cylinder 19 extends or contracts, the connection plate 18 moves in the X-direction with respect to the upper surface suction unit 16. Accordingly, the side surface suction unit 22 connected to the connection plate 18 moves along the X-direction.

The link mechanism 20 is connected between the connection plate 18 and the side surface suction unit 22. As shown in FIG. 4, the link mechanism 20 includes a pair of links 20*a* and 20*b*. The links 20*a* and 20*b* extend parallel to each other and are rotatable in synchronization with each other. One end of the link 20*a* and one end of the link 20*b* are connected to a rear end of the connection plate 18 via rotation shafts 20*c* and 20*d*, respectively. The rotation shafts 20*c* and 20*d* are rotatable with respect to the connection plate 18. Meanwhile, the links 20*a* and 20*b* are fixed to the rotation shafts 20*c* and 20*d*, respectively. Therefore, when the rotation shafts 20*c* and 20*d* rotate with respect to the connection plate 18, the links 20*a* and 20*b* also rotate.

The drive mechanism 21 is connected to the connection plate 18 and the link mechanism 20, and changes a position of the side surface suction unit 22 in the Z-direction. Specifically, the drive mechanism 21 includes a cylinder 21*a*, a rotation shaft 21*b*, a rotation shaft 21*c*, and a bar 21*d*. The cylinder 21*a* is provided along the rear portion of the connection plate 18. A tube body of the cylinder 21*a* is connected to the connection plate 18 via the rotation shaft 21*b*, and is rotatable with respect to the connection plate 18. A piston of the cylinder 21*a* is connected to one end of the bar 21*d* via the rotation shaft 21*c*, and is rotatable with respect to the bar 21*d*. The other end of the bar 21*d* is fixed to one of the rotation shafts 20*c* and 20*d*. In the suction hand 1, the bar 21*d* is fixed to the rotation shaft 20*c*. The side surface suction unit 22 is connected to the other end of the link 20*a* and the other end of the link 20*b* via rotation shafts 20*e* and 20*f*, respectively, and is rotatable with respect to the links 20*a* and 20*b*.

Figure 5A:
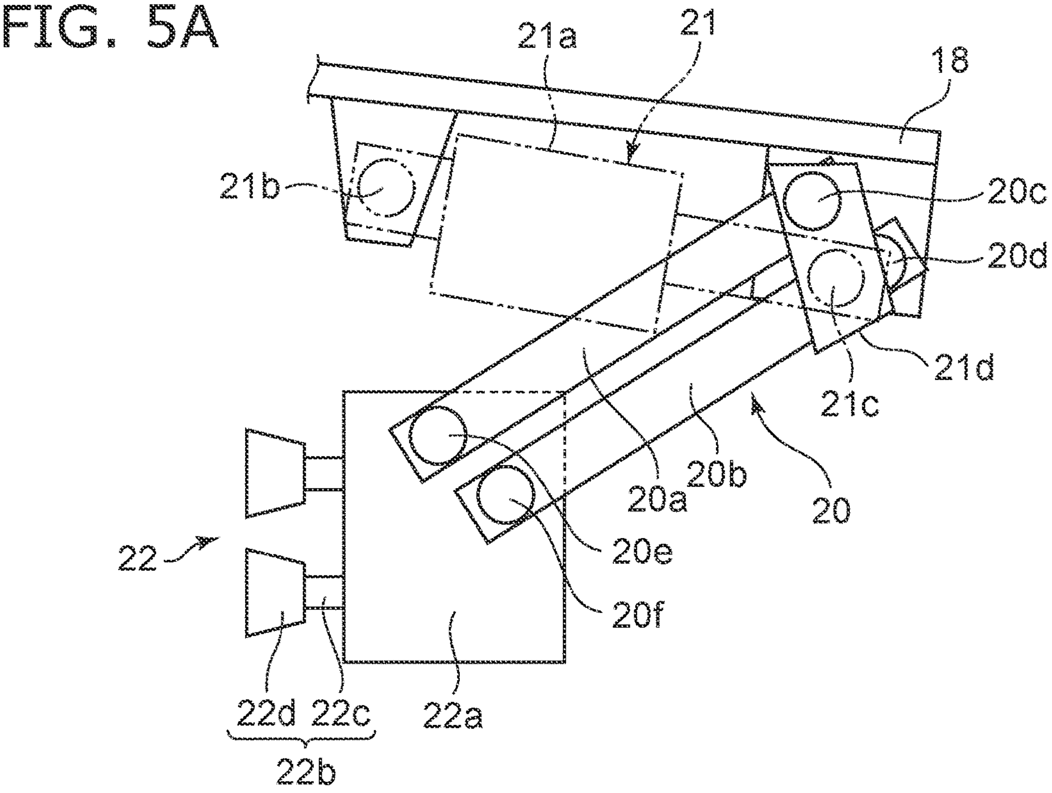
FIGS. 5A and 5B are side views schematically showing an operation of the suction hand according to the embodiment.
Figure 5B:
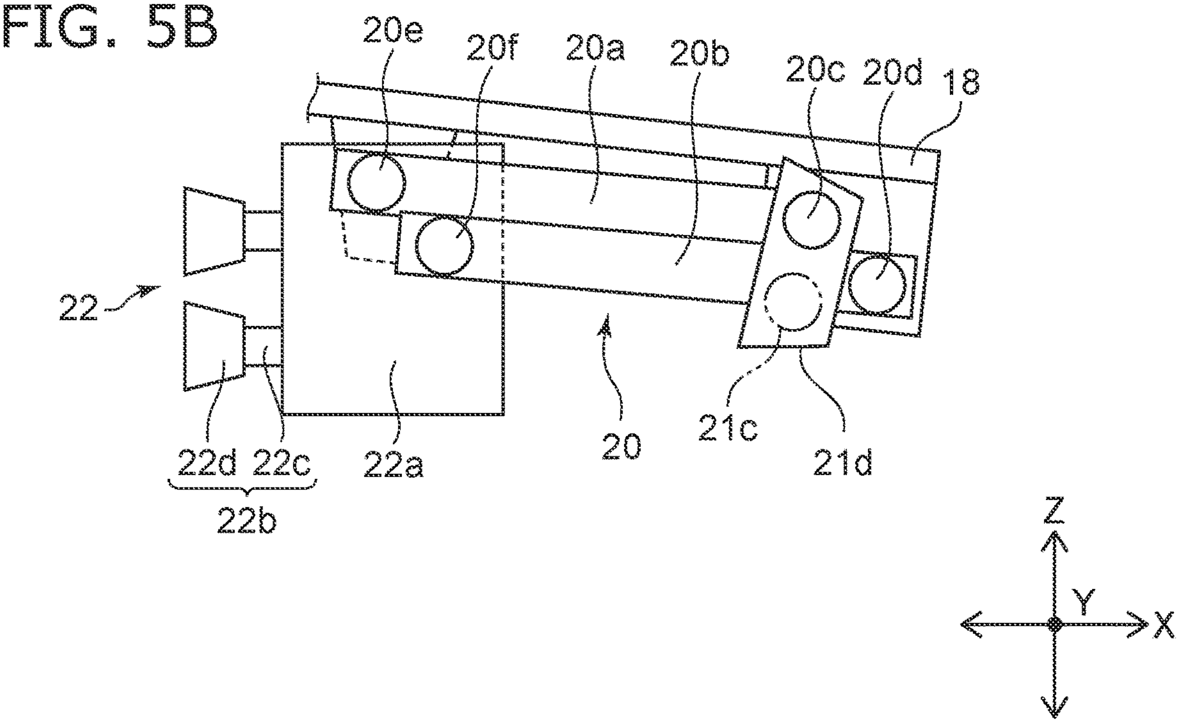

FIGS. 5A and 5B are side views schematically showing an operation of the suction hand according to the embodiment. In FIG. 5A, the cylinder 21*a*, the rotation shaft 21*b*, and the rotation shaft 21*c* are shown by broken lines. In FIG. 5B, the cylinder 21*a* and the rotation shaft 21*b* are omitted, and the rotation shaft 21*c* is shown by a broken line.

The rotation shafts 20*c* to 20*f*, 21*b*, and 21*c* are parallel to the Y-direction. As shown in FIGS. 5A and 5B, when the cylinder 21*a* extends or contracts, the bar 21*d* rotates around the Y-direction about the rotation shaft 20*c*. Since the bar 21*d* is fixed to the rotation shaft 20*c*, the rotation shaft 20*c* rotates in accordance with the rotation of the bar 21*d*. The link 20*a* fixed to the rotation shaft 20*c* rotates around the Y-direction about the rotation shaft 20*c*. The link 20*b* also rotates around the Y-direction in synchronization with the link 20*a*. Accordingly, the side surface suction unit 22 rotates around the Y-direction about the rotation shaft 20*c*. The position of the side surface suction unit 22 in the X-Z plane can be changed by an operation of the drive mechanism 21. For example, the position of the side surface suction unit 22 is switched according to an arrangement of the article to be held by the suction hand 1.

The side surface suction unit 22 includes a housing 22*a* and multiple suction portions 22*b* (second suction portions). Each suction portion 22*b* includes a rod 22*c* (second rod) and a suction pad 22*d* (second suction pad). The rod 22*c* extends along the X-direction. For example, the rod 22*c* is fixed to the housing 22*a*. The rod 22*c* may also be slidable in the X-direction with respect to the housing 22*a*. In this case, the side surface suction unit 22 is further provided with a clamper configured to fix the rod 22*c*. The suction pad 22*d* has flexibility and is provided at a tip end of the rod 22*c*. Spaces are provided inside the rod 22*c* and inside the suction pad 22*d*, and these spaces communicate with each other.

The multiple suction portions 22*b* are arranged along two directions crossing each other. A suction face of the suction pad 22*d* is parallel to a direction in which the multiple suction portions 22*b* are arranged. In the suction hand 1, the multiple suction portions 22*b* are arranged along the Y-direction and the Z-direction. The number of the suction portions 22*b*, a size of each suction portion 22*b*, an interval between the suction portions 22*b*, and the like are appropriately designed according to the article to be held.

A pipe or the like configured to connect the exhaust system (not shown) and the multiple suction portions 22*b* is provided inside the housing 22*a*. By the operation of the exhaust system, the inside of each suction pad 22*d* is collectively depressurized for one side surface suction unit 22. Pressure control on the side surface suction unit 22 is executed independently of pressure control on the upper surface suction unit 16.

The detector 23 is fixed to the base 11. The detector 23 detects lifting of the connection frame 14 with respect to the base 11. Based on a detection signal from the detector 23, it can be determined whether the upper surface suction unit 16 is in contact with the article. For example, the detector 23 includes one or more sensors selected from an optical sensor, a proximity sensor, a distance measuring sensor, and a transmissive sensor. The detector 23 may also be provided at a place other than the shown place. For example, the detector 23 may be provided in the upper surface suction unit 16, and may more directly detect approaching of the article with respect to the upper surface suction unit 16.

The controller 25 controls each component of the suction hand 1. For example, the controller 25 operates the cylinders 12*a*, 15*e*, 19, and 21*a*. The controller 25 also the control exhaust systems for exhausting the upper surface suction unit 16 and the side surface suction unit 22, respectively.

The cylinders 12*a*, 15*e*, 19, and 21*a* are air cylinders (an example of actuators). Other actuators may be provided instead of the cylinders 12*a*, 15*e*, 19 and 21*a*. For example, a motor and a mechanical element that converts the rotational motion of the motor into linear motion may be provided.

In addition, the controller 25 switches between a first state in which the side surface suction unit 22 is at a first position and a second state in which the side surface suction unit 22 is at a second position. FIG. 5A shows the state when the side surface suction unit 22 is at the first position. The side surface suction unit 22 can hold the side surface of the article at the first position. When the side surface suction unit 22 is at the first position, the side surface suction unit 22 is positioned below at least a portion of the upper surface suction unit 16. For example, the suction portion 22*b* is located below the upper ends of the housing 16*a* and the rod 16*c* of the upper surface suction unit 16. FIG. 5B shows the state when the side surface suction unit 22 is at the second position. The second position is above the first position. When the side surface suction unit 22 is at the second position, the side surface suction unit 22 is positioned above at least a portion of the upper surface suction unit 16. For example, the suction portion 22*b* is located above the suction portion 16*b* of the upper surface suction unit 16.

Figure 6:
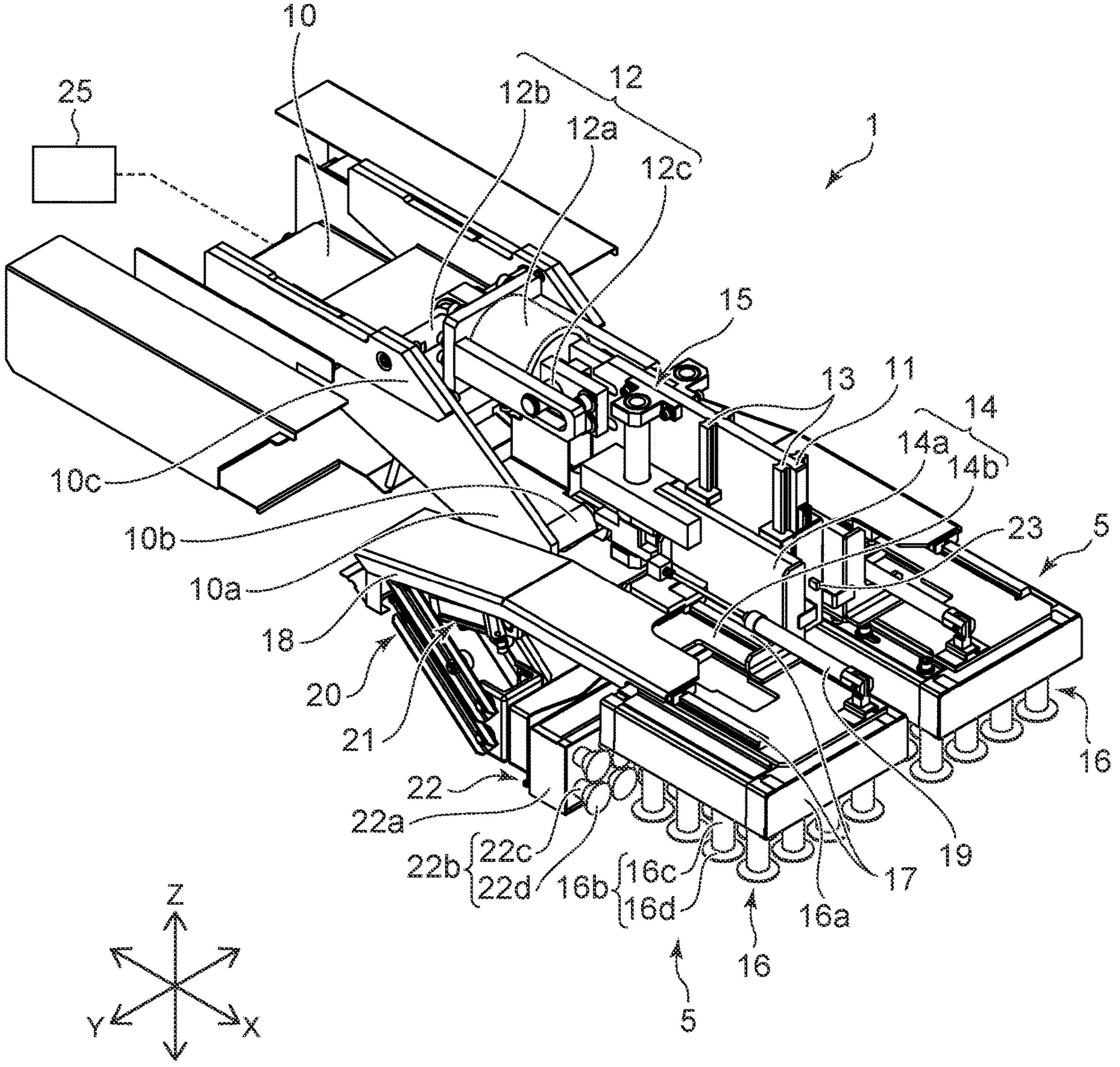
FIG. 6 is a perspective view showing the hand according to the embodiment.

FIG. 6 is a perspective view showing the hand according to the embodiment.

FIG. 6 shows a state when the suction hand 1 is viewed from a direction different from that of FIG. 2. The direction in which the suction hand 1 is viewed in FIG. 6 is substantially symmetrical to the direction in which the suction hand 1 is viewed in FIG. 2 with respect to the X-Z plane passing through a center of the suction hand 1 in the Y-direction. As shown in FIG. 2 and FIG. 6, suction mechanisms 5 each including the linear guide 13, the connection frame 14, the fixing mechanism 15, the upper surface suction unit 16, the linear guide 17, the connection plate 18, the cylinder 19, the link mechanism 20, the drive mechanism 21, and the side surface suction unit 22 are provided on two side surfaces of the base 11. Therefore, for example, multiple upper surface suction units 16 and multiple side surface suction units 22 are provided in the Y-direction.

The suction mechanisms 5 are movable independently of each other. Further, the cylinders 19 and 21*a* shown in FIGS. 4 and 5 are provided for each suction mechanism 5. The cylinders 19 and 21*a* can operate independently for each suction mechanism 5. Therefore, the positions of the respective upper surface suction units 16 in the Z direction may be different from each other. The positions of the respective side surface suction units 22 in the X-Z plane may be different from each other.

The transfer apparatus 100 can perform a first operation and a second operation. The first operation and the second operation differ from each other in the number of articles to be held, the holding method, and the transfer method.

Figure 7A:
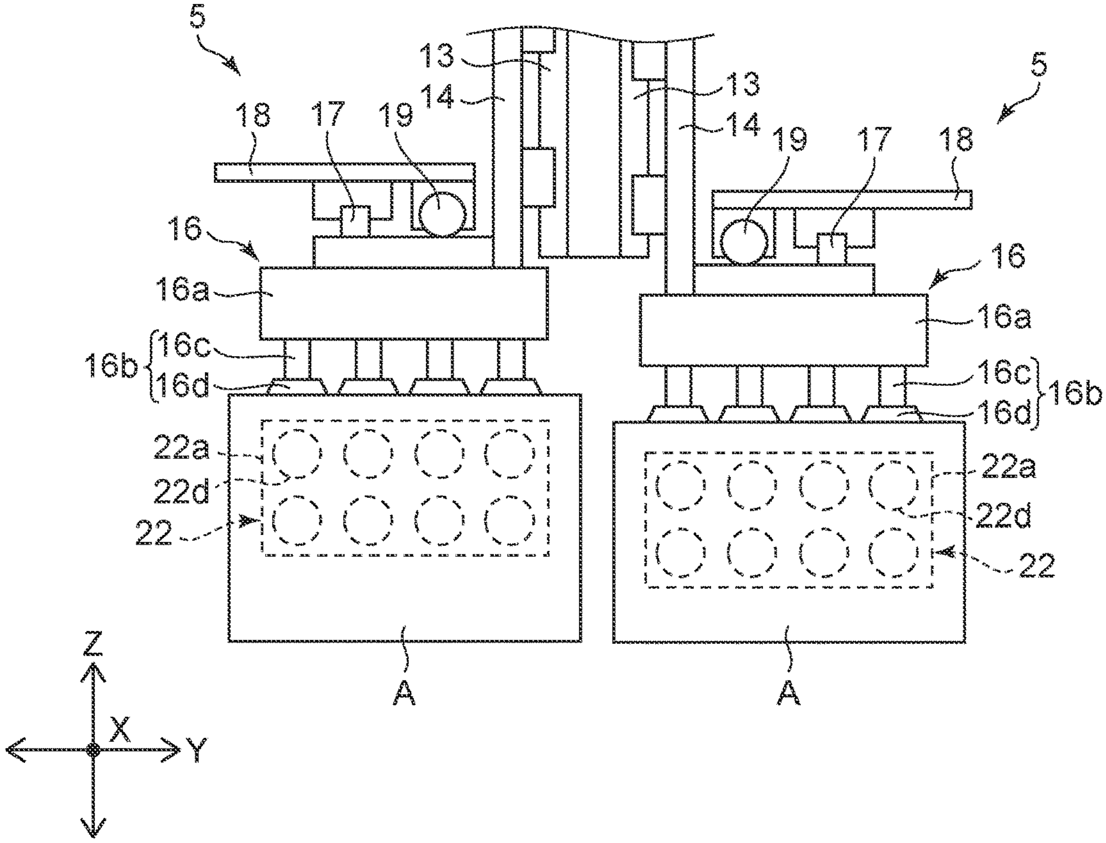
FIG. 7A is a front view schematically showing the holding method in the first operation.
Figure 7B:
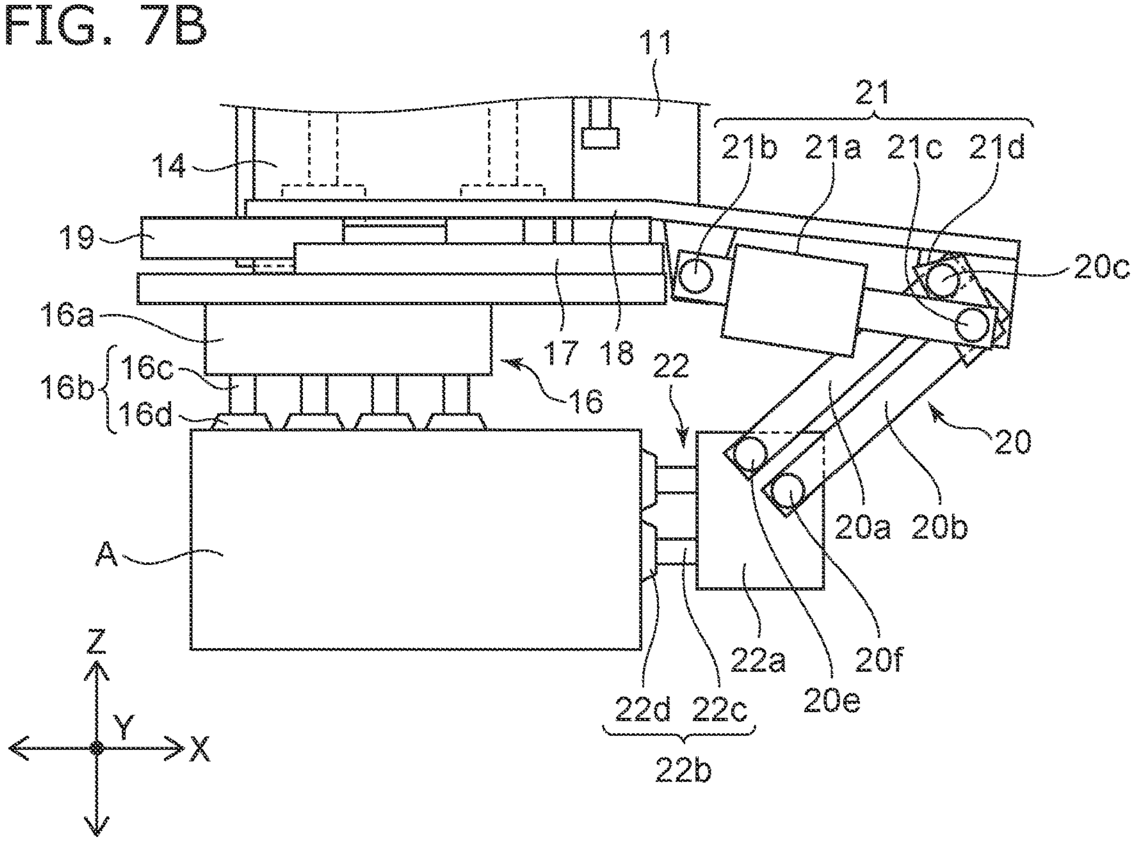
FIG. 7B is a side view schematically showing the holding method in the first operation.

FIG. 7A is a front view schematically showing the holding method in the first operation. FIG. 7B is a side view schematically showing the holding method in the first operation.

As shown in FIGS. 7A and 7B, the suction hand 1 holds the multiple articles A in the first operation. The multiple articles A are suctioned by multiple suction mechanisms 5, respectively. Specifically, the upper and side surfaces of one article A are respectively suctioned by the upper surface suction unit 16 and the side surface suction unit 22 of one suction mechanism 5. The upper and side surfaces of another article A are respectively suctioned by the upper surface suction unit 16 and the side surface suction unit 22 of the other suction mechanism 5. The transfer apparatus 100 slide multiple held articles A on the upper surface of another article A or the upper surface of the pallet P to move the multiple articles A. Alternatively, the transfer apparatus 100 may lift the article A while suctioning the upper and side surfaces of the article A.

FIGS. 8A to 8C are side views schematically showing states when the article is held in the first operation.

When the article is suctioned, as shown in FIG. 8A, the upper surface suction unit 16 comes into contact with the upper surface of the article A and suctions the upper surface. Next, as shown in FIG. 8B, the side surface suction unit 22 is brought into contact with a side surface of the article A by an operation of the cylinder 19. The side surface suction unit 22 suctions the side surface. The suction hand 1 holds the article A by the suction of the upper surface and the side surface of the article A.

Subsequently, the suction hand 1 is lifted. At this time, when the cylinder **12*a* is opened or thrust of the cylinder 12*a* is weak, the cylinder 12*a* extends due to weight of the suction mechanism 5 and the article A. Accordingly, as shown in FIG. 8C, the upper surface suction unit 16 and the side surface suction unit 22** are inclined with respect to the X-Y plane in a state where the article A is held. If the inclination is too large, contents of the article A may collapse. Therefore, an inclination angle with respect to the X-Y plane is preferably larger than 0° and less than 15°.

For example, an adhesive for attaching a label, an adhesive of a packing tape, or the like may be adhered to the upper surface of the article A. There may be a case where the upper surface of another article A is stuck to a bottom surface of the held article A by the adhesive. By being inclined, the held article A can be easily peeled off from the other article A. Accordingly, when the article A is conveyed, friction between the conveyed article A and the other article A can be reduced.

Figure 9A:
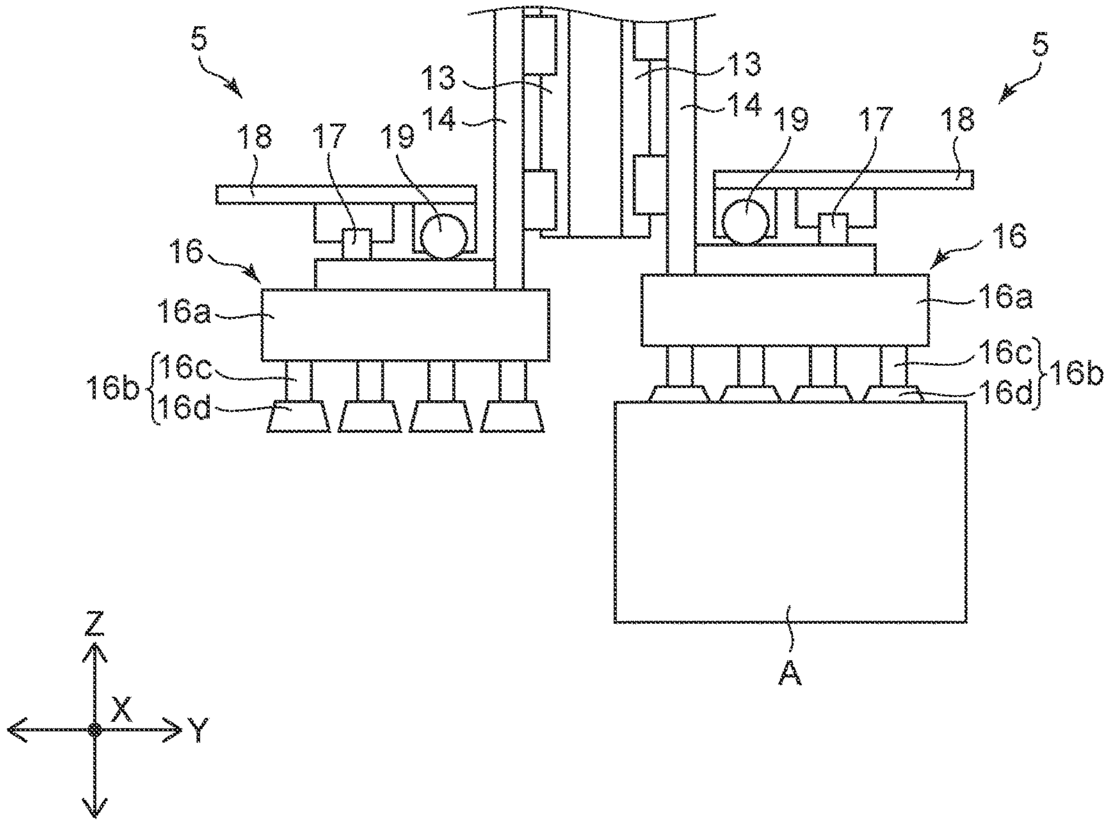
FIG. 9A is a front view schematically showing the holding method in the second operation.
Figure 9B:
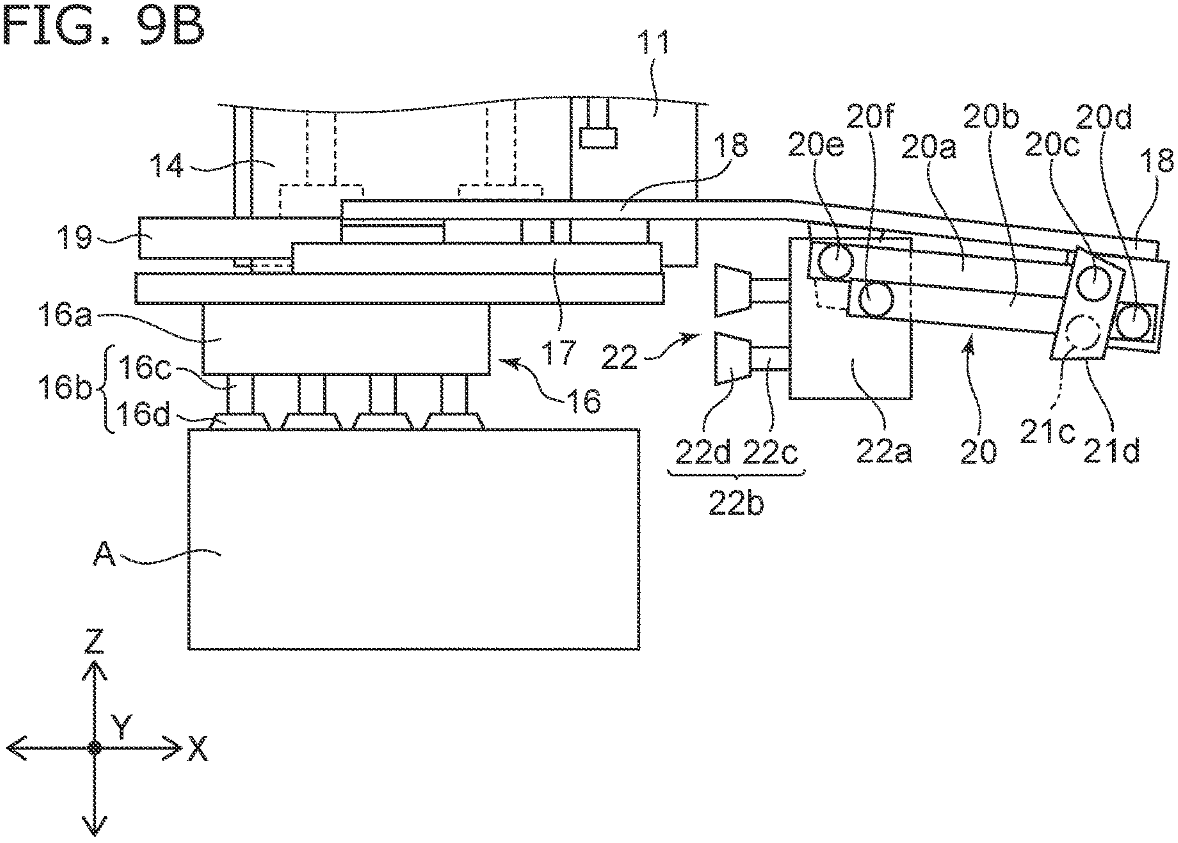
FIG. 9B is a side view schematically showing the holding method in the second operation.

FIG. 9A is a front view schematically showing the holding method in the second operation. FIG. 9B is a side view schematically showing the holding method in the second operation.

As shown in FIGS. 9A and 9B, in the second operation, one article A is held by the suction hand 1. The upper surface of the one article A is suctioned by the upper surface suction unit 16. The side surface suction unit 22 is located at the second position, and the side surface of the article A is not suctioned. The transfer apparatus 100 lifts the one held article A and then moves it along the X-Y plane.

According to the first operation, since multiple articles A can be moved, work efficiency can be improved. Further, according to the first operation, the upper surface and side surfaces of the article A can be suctioned. Thus, the article A can be moved more stably. Furthermore, when the article A is slid in the first operation, it is not necessary to lift the article A greatly, so the movement time of the article can be shortened. According to the second operation, since the article A is lifted, the article A can be moved regardless of the state between the held article A and the conveyor 150.

Figure 10:
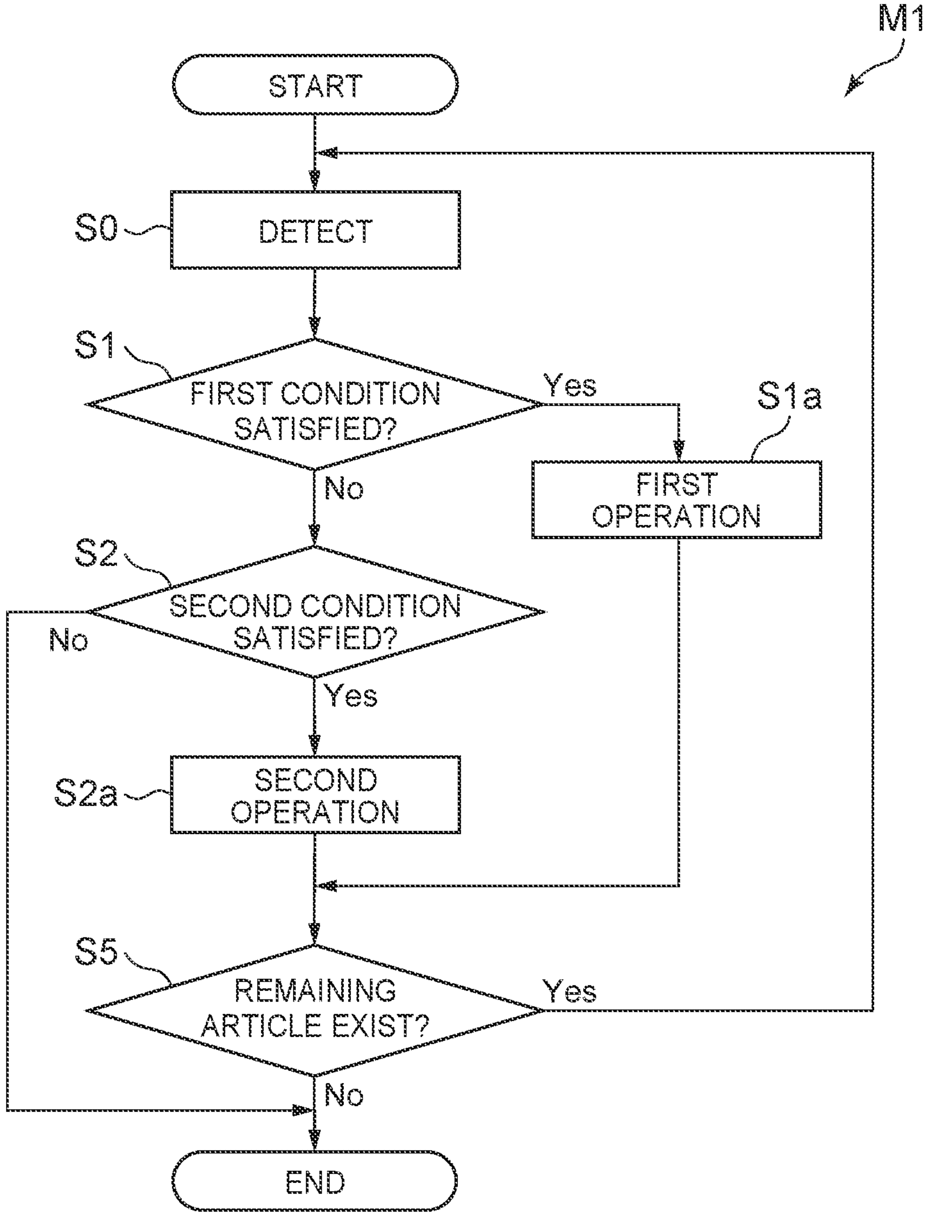
FIG. 10 is a flowchart showing an outline of a transfer method by the transfer apparatus according to the embodiment.

FIG. 10 is a flowchart showing an outline of a transfer method by the transfer apparatus according to the embodiment.

In the transfer method M1, first, the first detector 121 detects the upper surface of the article A placed on the pallet P (step S0). The controller 25 determines whether the placement state calculated based on the detection result of the first detector 121 satisfies the first condition (step S1: first determination). The placement state indicates the state of multiple articles placed on the pallet P, and includes data such as the recognition result of the upper surface of each article, the position of each upper surface, and the size of each upper surface. To obtain a more accurate placement state, the placement state may be calculated based on both detection results of the first detector 121 and the second detector 122. In this case, the placement state further includes data such as the recognition result of the side surface of each article, the position of each side surface, and the height of each article.

In the case where the first condition is satisfied, the controller 25 performs the first operation (step S**1*a*). In the case where the first condition is not satisfied, the controller 25 determines whether the placement state satisfies the second condition (step S2: second determination). In the case where the second condition is satisfied, the controller 25 performs the second operation (step S2*a*). In the case where the second condition is not satisfied, the transfer apparatus 100 determines that there is no article A to be transferred. The transfer apparatus 100** ends the transfer operation.

After the first operation or the second operation, the controller 25 determines whether or not another article A remains on the pallet P (step S5). If there is any article A remaining, step S0 is executed again. When there is no remaining article A, the transfer apparatus 100 ends the transfer operation.

Details of the first determination, the first operation, the second determination, and the second operation in the transfer method M1 will be described below.

(First Determination)

Figure 11:
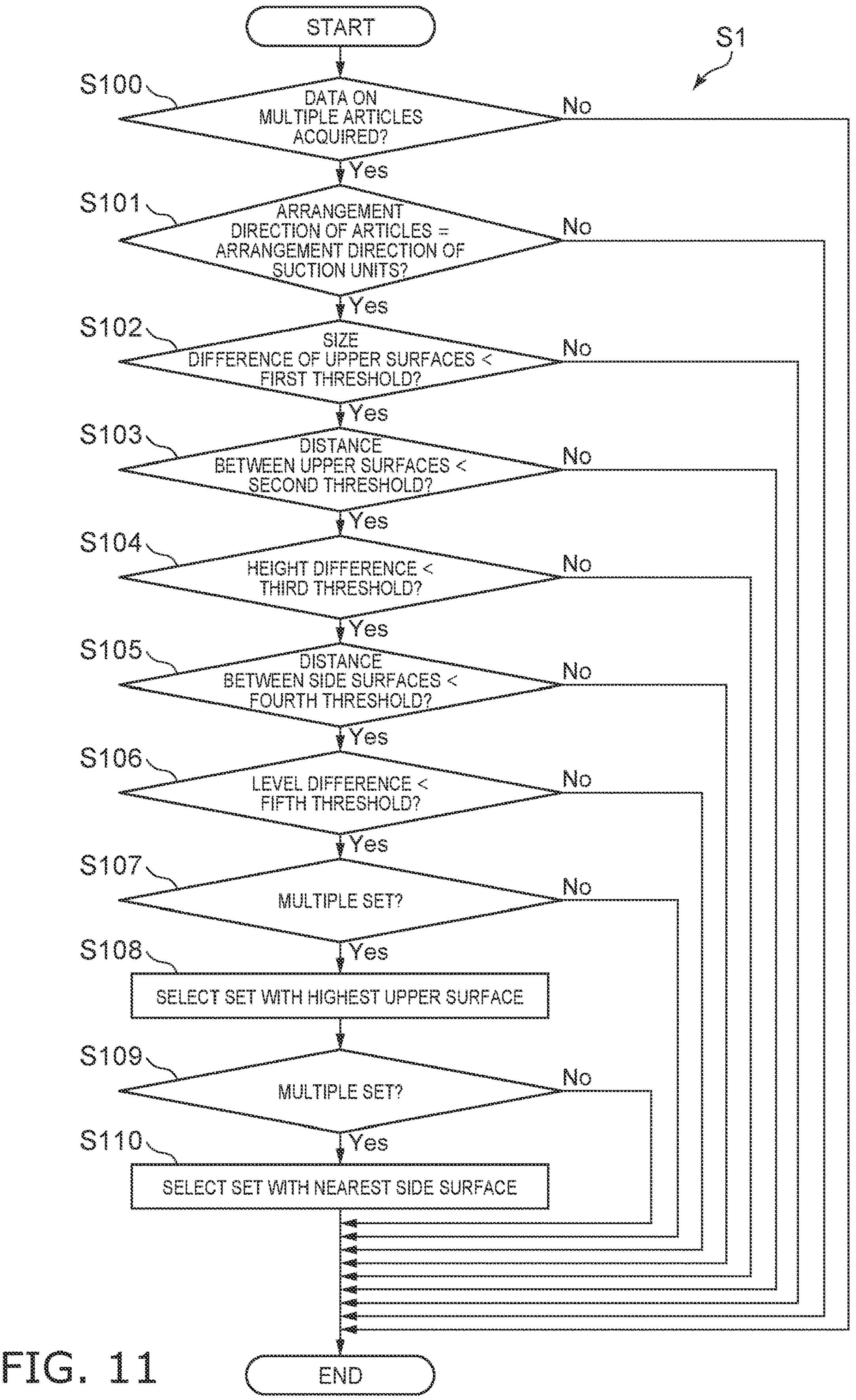
FIG. 11 is a flowchart showing processing in the first determination.

FIG. 11 is a flowchart showing processing in the first determination.

First, the controller 25 determines whether data on the upper and side surfaces of multiple articles has been acquired (step 100). Specifically, the controller 25 determines whether or not the positions of the upper surfaces of the multiple articles and the positions of the side surfaces of the multiple articles has been detected by the first detector 121. This determination may be performed based on the detection result by the second detector 122 in addition to the detection result by the first detector 121.

In the case where data on the upper and side surfaces of multiple articles has been acquired, the controller 25 determines whether there is a set of articles in which the arrangement direction of two or more articles is the same as the arrangement direction of the suction unit (step 101). In the transfer apparatus 100, the multiple upper surface suction units 16 and the multiple side surface suction units 22 are arranged in the Y-direction. Therefore, the controller 25 determines whether there is a set of articles arranged in the Y-direction.

In the case where there is a set of articles arranged in the Y-direction, the controller 25 determines whether there is a set of articles whose upper surface size difference is less than the first threshold (step S102). For example, the controller 25 compares the length difference in the X-direction between the articles with the first threshold. The controller 25 may compare the length difference in the Y-direction between the articles with the first threshold. The controller 25 may compare the difference in the area of the upper surfaces of the articles with the first threshold. The controller 25 may compare two or more selected from the length in the X-direction, the length in the Y-direction, and the area between the articles. In this case, different first thresholds may be respectively set for the length in the X-direction, the length in the Y-direction, and the area. A value that allows the multiple articles to be stably slid in the first operation is set as the first threshold.

In the case where there is a set of articles whose upper surface size difference is less than the first threshold, the controller 25 calculates the distance between the position of the upper surface of one article in the Z-direction and the position of the upper surface of the other article in the Z-direction. The controller 25 determines whether the distance is less than the second threshold (step S103). The second threshold is set based on the movable range of the suction mechanism 5 in the Z-direction, the variable amount of the suction pad 16*d* in the Z-direction, and the like. In the step S103, it is determined whether the difference in the positions of the upper surfaces of the multiple articles is small enough to hold the articles at the same time.

In the case where the distance between the upper surfaces is less than the second threshold, the controller 25 determines whether the height difference between the articles is less than the third threshold (step 104). A value that allows the multiple articles to be stably slid in the first operation is set as the third threshold.

In the case where the height difference is less than the third threshold, the controller 25 determines whether the distance between the side surfaces of the articles in the X-direction is less than the fourth threshold (step 105). The fourth threshold is set based on a movable range in the X-direction of the side surface suction unit 22 with respect to the upper surface suction unit 16, a variable amount in the X-direction of the suction pad 22*c*, and the like. That is, in the step 105, it is determined whether the difference in the positions of the side surfaces (front surfaces) of the multiple articles is small enough to simultaneously hold the articles.

In the case where the distance between the side surfaces is less than the fourth threshold, the controller 25 determines whether the level differences in the movement paths of the multiple articles are less than the fifth threshold (step S106). For example, in the first operation, the held article slides over the upper surface of another article between the held article and conveyor 150. That is, the moving path is the upper surface of the other article. The level difference is, in other words, the distance in the Z-direction between the upper surfaces of the other article. If the level difference is large, when the article is slid, the held article is caught and the sliding is disturbed. A value that allows the multiple articles to be stably slid is set as the fifth threshold. Alternatively, the movement path may be the upper surface of the pallet P. Since the upper surface of the pallet P is substantially flat, it is determined that the level difference is less than the fifth threshold.

In the case where it is determined that the condition is not satisfied in any one of the steps S100 to S106, the controller 25 determines that the placement state of the article does not satisfy the first condition. The first determination ends.

In the case where the level difference is less than the fifth threshold, the controller 25 determines whether multiple sets of articles satisfying the conditions of steps S100 to S106 exist (step S107). In the case where there are multiple sets, the controller 25 selects one set including an article whose upper surface is at the highest position from the multiple sets (step 108). The controller 25 determines whether multiple sets selected in the step S108 exist (step S109). In the case where there are multiple sets, the controller 25 selects one set including an article whose side surface is nearest from the multiple sets (step S110). "Nearest" means that the distance in the X-Z plane between the article and the distance measuring sensor 122*a* is the shortest. In the step S107 or S109, if multiple sets do not exist, one set is selected as the object to be held simultaneously. In the case where there are multiple sets selected in the step S110, an arbitrary set is selected from the multiple selected sets. For example, the set including an article closest to the distance measuring sensor 122*a* is selected from the multiple sets. The transfer apparatus 100 simultaneously moves multiple articles included in the selected set by the first operation.

As described above, the first condition for the first operation includes that the upper and side surface of each of the multiple articles A can be detected, that the multiple articles A are arranged in the Y-direction, that the upper surfaces of the multiple articles A can be simultaneously suctioned by the multiple upper surface suction units 16, that the side surfaces of the multiple articles A can be simultaneously suctioned by the multiple side surface suction units 22, and that the multiple articles A can be simultaneously slid along the X-direction. Multiple articles which can be stably moved are selected by first determination using the first condition.

Only part of the conditions described above may be used in the first determination. Relaxing the conditions may reduce the stability of holding or transferring, but may increase the number of cases where multiple articles can be held at the same time. It improves the efficiency of transferring.

The conditions used in the first determination may include another condition in addition to the conditions described above. For example, the detection result by the first detector 121 includes the centroid of the article in the X-Y plane. The first condition includes that the centroid of the article is positioned within a preset first range when the article is held. The first range is set based on the position of the upper surface suction unit 16 when holding the article. As an example, the outer edge in the X-Y plane of the upper surface suction unit 16 when holding the article is set as the outer edge of the first range. When the upper surface suction unit 16 contacts the article, it is determined whether the centroid is located inside the outer edge of the upper surface suction unit 16 in the X-Y plane. In order to improve holding stability, the outer edge of the first range may be set smaller than the outer edge of the upper surface suction unit 16.

Figure 12:
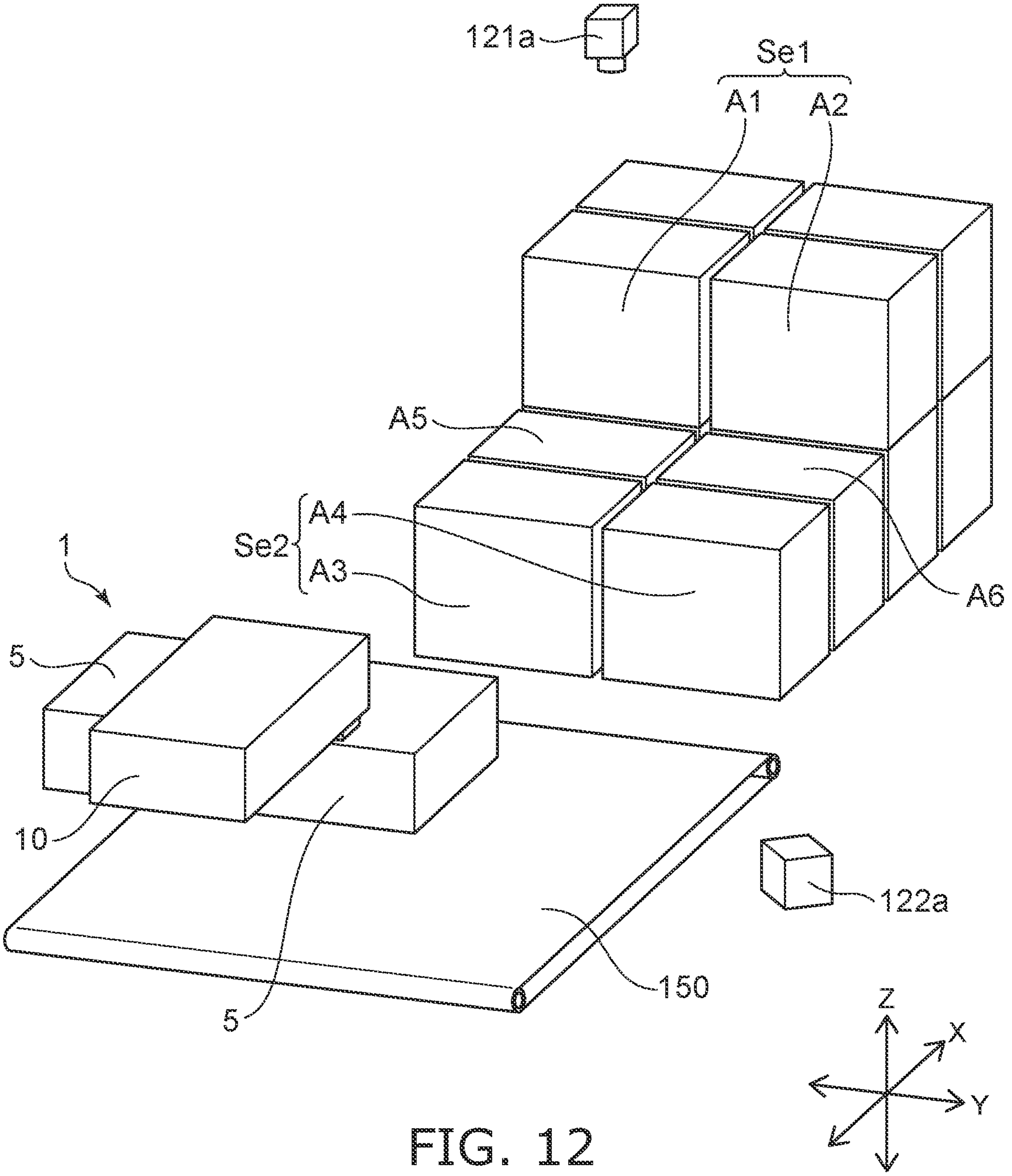
FIG. 12 is a schematic view for explaining the processing in the first determination.

FIG. 12 is a schematic view for explaining the processing in the first determination.

As an example, multiple articles A are loaded as shown in FIG. 12. The imager 121*a* images the articles A from above. The second detector 122 detects the positions of the side surfaces of the articles A. Of the multiple articles A, articles A1 to A4 are not loaded with other articles. At the height (position in the Z-direction) where the articles A1 and A2 are arranged, no other article is placed in front of the articles A1 and A2. At the height where the articles A3 and A4 are arranged, no other article is placed in front of the articles A3 and A4. Therefore, in the step S100, the articles A1 to A4 are extracted as articles for which data on both the upper surface and the side surface can be obtained.

In the step S101, it is determined whether a set of articles arranged in the Y-direction exists for the extracted articles A1 to A4. As a result, it is determined that there is a set Se1 consisting of the articles A1 and A2 and a set Se2 consisting of the articles A3 and A4.

In the step S102, it is determined whether the difference between the size of the upper surface of the article A1 and the size of the upper surface of the article A2 is less than the first threshold. It is also determined whether the difference between the size of the upper surface of the article A3 and the size of the upper surface of the article A4 is less than the first threshold. In the example shown in FIG. 12, multiple articles of substantially the same size are stacked. Therefore, in the step S102, it is determined that any difference is less than the first threshold.

Similarly, in the step S103, it is determined that the distance in the Z-direction between the upper surface of the article A1 and the upper surface of the article A2 is less than the second threshold, and determined that the distance in the Z-direction between the upper surface of the article A3 and the upper surface of the article A4 is less than the second threshold. In the step S104, it is determined that the difference between the heights of the articles A1 and A2 is less than the third threshold, and determined that the difference between the heights of the articles A3 and A4 is less than the third threshold. In the step S105, it is determined that the distance in the X-direction between the front surface of the article A1 and the front surface of the article A2 is less than the fourth threshold, and determined that the distance in the X-direction between the front surface of the article A3 and the front surface of the article A4 is less than the fourth threshold.

In the step S106, the upper surfaces of the articles A3 to A6 are determined to be the movement path of the set Se1. For example, it is determined that the level difference in the movement path of the set Se1 is less than the fifth threshold. That is, it is determined that the distance in the Z-direction between the upper surface of the article A3 and the upper surface of the article A5 is less than the fifth threshold, and determined that the distance in the Z-direction between the upper surface of the article A4 and the upper surface of the article A6 is less than the fifth threshold. There are no other articles between the set Se2 and the conveyor 150. Therefore, it is determined that the level difference in the movement path of the set Se2 is less than the fifth threshold.

In the step S107, it is determined that multiple sets satisfying the conditions of steps S100 to S106 exist. In the step S108, the positions of the respective upper surfaces of the articles A1 to A4 are compared. As a result, the set Se1 including the articles A1 and A2 with the upper surface at the highest position is selected. In the step S109, a number of the set selected in the step S108 is one. Therefore, the set Se1 is selected as the object to be held by the first operation. After the set Se1 is moved by the first operation, the set Se2 is selected as the object to be held by the first operation in the next first determination.

(First Operation)

Figure 13:
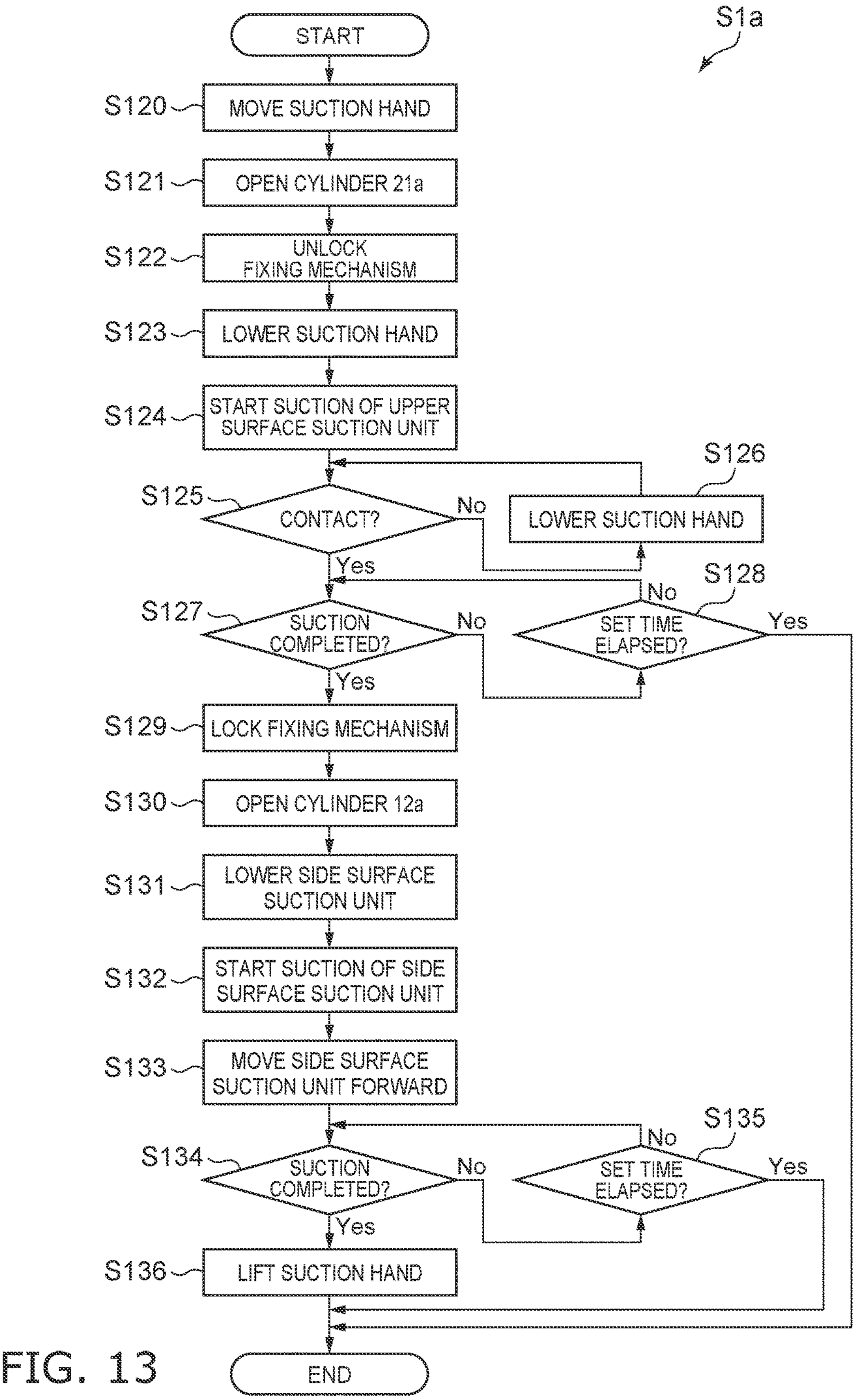
FIG. 13 is a flowchart showing a part of the first operation.
Figure 14:
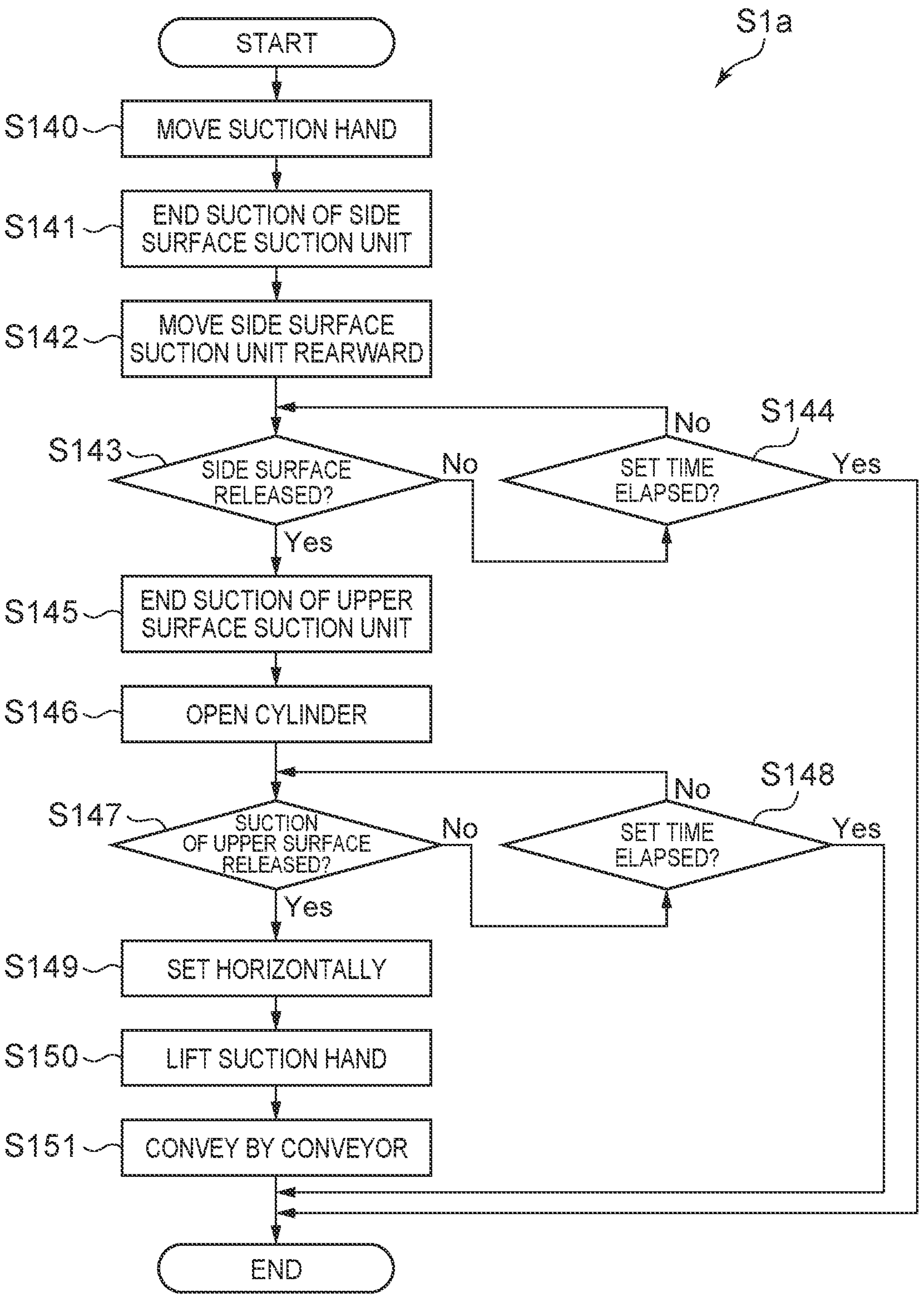
FIG. 14 is a flowchart showing another part of the first operation.

FIG. 13 is a flowchart showing a part of the first operation. FIG. 14 is a flowchart showing another part of the first operation. FIGS. 15A to 15C, FIGS. 16A to 16C, and FIGS. 17A to 17C are schematic views showing the first operation.

Figure 15A:
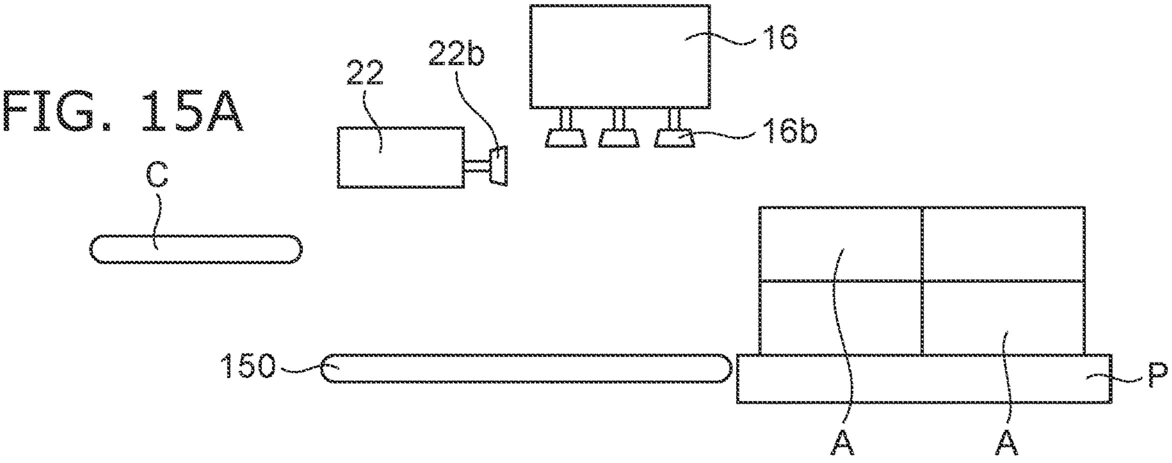
FIGS. 15A to 15C are schematic views showing the first operation.
Figure 15B:
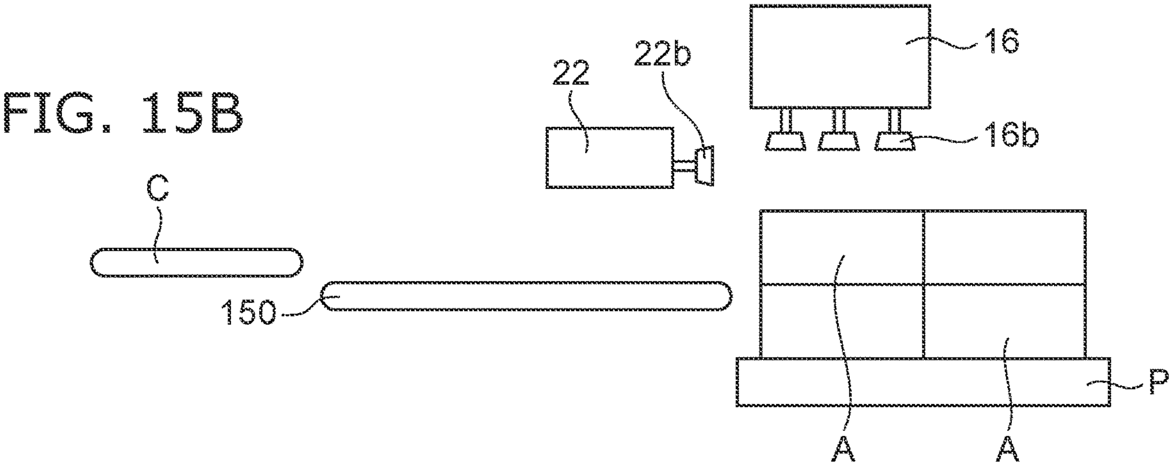

The horizontal moving device 131 moves the suction hand 1 along the X-Y plane (step S120 in FIG. 13). As shown in FIGS. 15A and 15B, the suction hand 1 is located above the article A selected in the first determination. Also, the position of the conveyor 150 in the Z-direction is set to the same position as the bottom surface of the article A to be held. Since FIGS. 15A to 17C are side views, only one upper surface suction unit 16 and one side surface suction unit 22 are shown. In the depth direction, there are another upper surface suction unit 16, another side surface suction unit 22, and another article A (not shown).

Figure 15C:
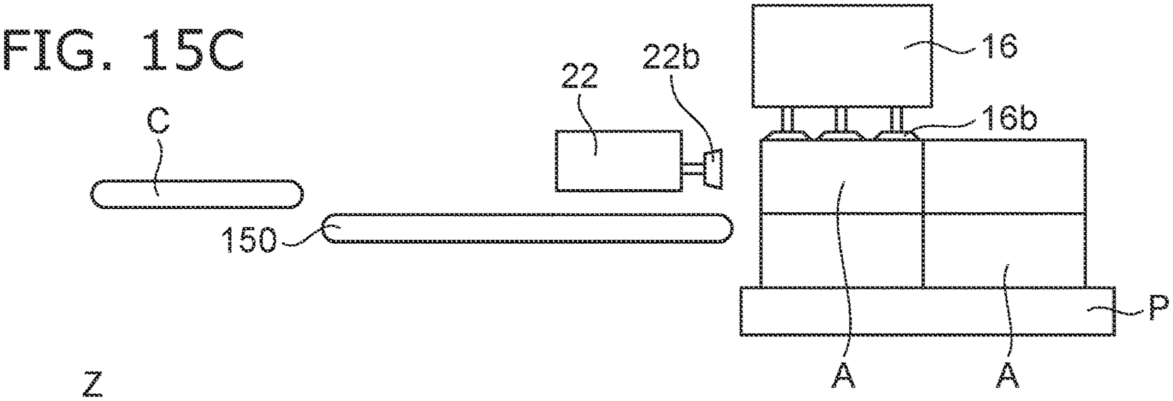
Figure 15C:
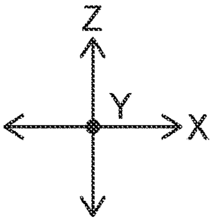

The cylinder 21*a* of the drive mechanism 21 is opened (step S121). That is, no force is applied from the cylinder 21*a* to the link mechanism 20, and the side surface suction unit 22 is in the movable state. The fixing mechanism 15 is set to the unlocked state (step S122), and the connection frame 14 is in the movable state. As shown in FIG. 15C, the lifting-and-lowering device 132 lowers the suction hand 1 toward the article A (step S123). The suction hand 1 is lowered to the position of the upper surface of the selected article A.

The upper surface suction unit 16 starts suction of the upper surface of the article A (step S124). Specifically, the controller 25 operates the negative pressure generator 140 to exhaust the inside of the suction portion 16*b*. The controller 25 determines whether the upper surface suction unit 16 is in contact with the article A (step S125). The contact is determined based on the detection signal of the detector 23. When it is determined that the upper surface suction unit 16 is not in contact with the article A, the lifting-and-lowering device 132 lowers the suction hand 1 again (step S126). After the execution of step S126, the step S125 is executed again.

When it is determined that the upper surface suction unit 16 is in contact with the article A, the controller 25 determines whether the suction of the article A by the upper surface suction unit 16 is completed (step S127). Whether the suction is completed is determined based on the pressure in the upper surface suction unit 16. When it is determined that the suction is not completed, the suction by the upper surface suction unit 16 is continued. The controller 25 determines whether a preset time has elapsed from the start of the suction (step S128). When the suction is not completed even after the set time has elapsed, the controller 25 ends the first operation.

When the suction is completed, the fixing mechanism 15 is set to the locked state (step S129), and the position of the upper surface suction unit 16 in the suction hand 1 is fixed. The cylinder 12*a* of the inclination mechanism 12 is opened (step S130). Accordingly, the upper surface suction unit 16 and the side surface suction unit 22 are in a state of being inclinable with respect to the X-Y plane. The drive mechanism 21 lowers the side surface suction unit 22 by an operation of the cylinder 21*a* (step S131). Fluid is injected into the cylinder 21*a*, and the position of the side surface suction unit 22 is fixed with respect to the upper surface suction unit 16. The side surface suction unit 22 starts suction (step S132). Specifically, the controller 25 operates the negative pressure generator 140 to exhaust the inside of the suction portion 22*b*.

Figure 16A:
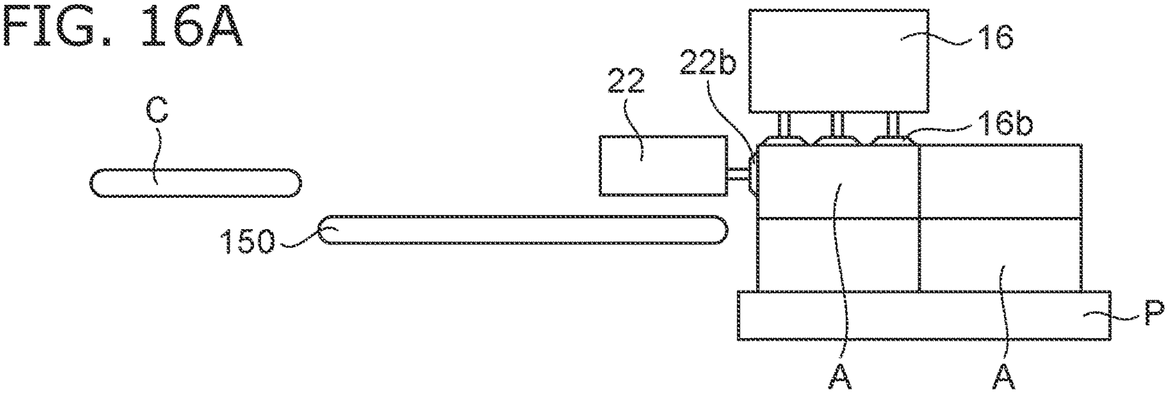
FIGS. 16A to 16C are schematic views showing the first operation.

The cylinder 19 moves the side surface suction unit 22 forward (step S133). The side surface suction unit 22 comes into contact with the side surface of the article A as shown in FIG. 16A. The controller 25 determines whether the suction of the article A by the side surface suction unit 22 is completed (step S134). Whether the suction is completed is determined based on the pressure in the side surface suction unit 22. When it is determined that the suction is not completed, the suction by the side surface suction unit 22 is continued. The controller 25 determines whether a preset time has elapsed from the start of the suction (step S135). When the suction is not completed even after the set time has elapsed, the controller 25 ends the first operation.

Figure 16B:
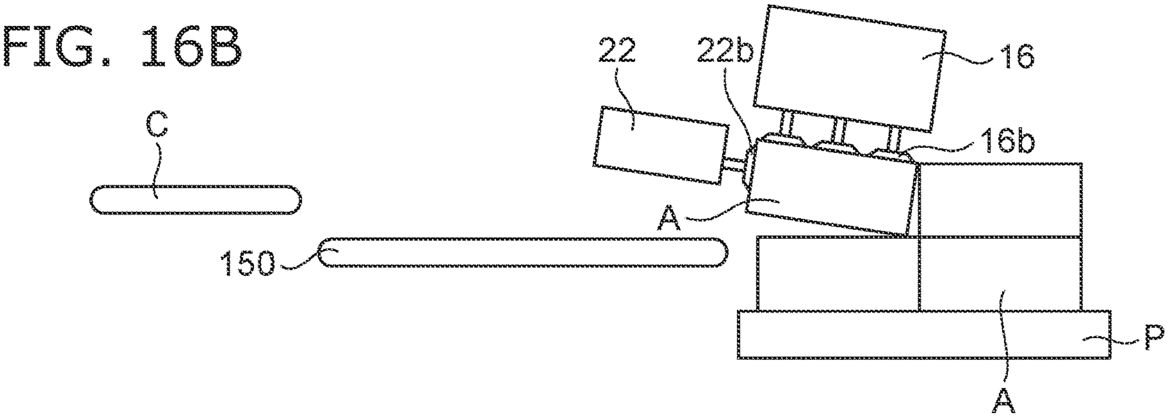
Figure 16C:
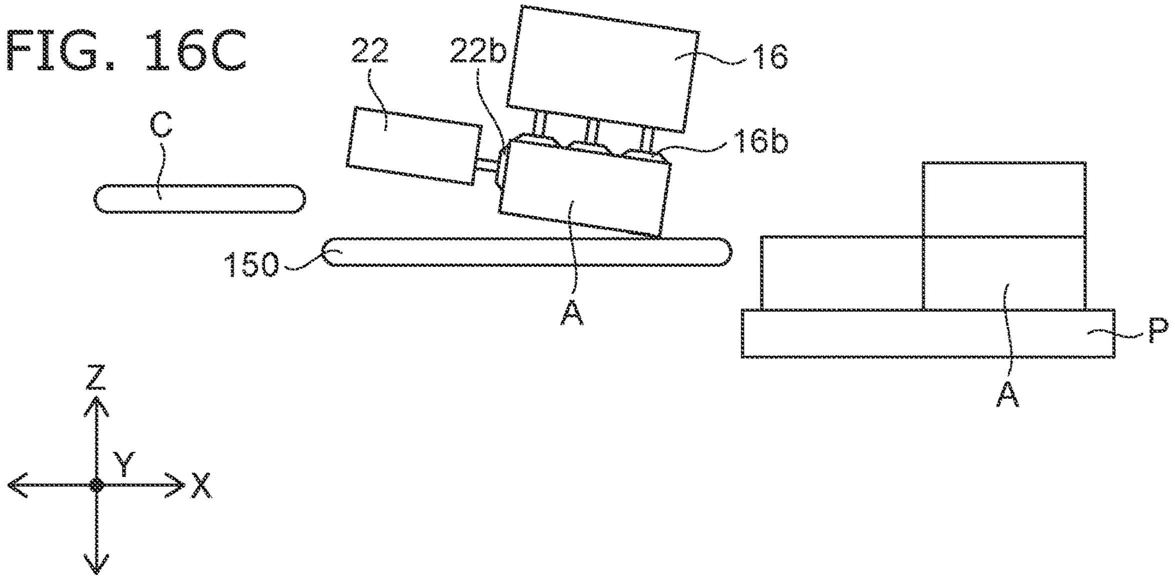

When the suction is completed, the lifting-and-lowering device 132 slightly lifts the suction hand 1 (step S136). At this time, since the cylinder 12*a* of the inclination mechanism 12 is opened, the cylinder 12*a* extends due to the weight of the suction mechanism 5 and the article A. As shown in FIG. 16B, the upper surface suction unit 16 and the side surface suction unit 22 are inclined with respect to the X-Y plane. After the step S136, the horizontal moving device 131 moves the suction hand 1 toward the conveyor 150 along the X-Y plane (step S140 in FIG. 14). Accordingly, as shown in FIG. 16C, the held article A is conveyed onto the conveyor 150. The side surface suction unit 22 ends the suction to the side surface of the article A (step S141). Specifically, the controller 25 increases the pressure of the side surface suction unit 22. For example, the controller 25 opens the inner space of the side surface suction unit 22 to the atmosphere.

The cylinder 19 moves the side surface suction unit 22 rearward (step S142). Accordingly, the side surface suction unit 22 is separated from the article A. The controller 25 determines whether the side surface of the article A suctioned by the side surface suction unit 22 is released (step S143). Whether the side surface is released is determined based on the pressure in the suction portion 22*b*. When it is determined that the suctioned side surface is not released, the controller 25 stands by. When the pressure of each of the suction portions 22*b* increases during the standby, the side surface is released. In addition, during the standby, the controller 25 determines whether a preset time has elapsed from the end of the suction to the side surface (step S141). When the side surface is not released even after the set time has elapsed, the controller 25 ends the first operation.

When the suctioned side surface is released, the upper surface suction unit 16 ends the suction to the upper surface of the article A (step S145). Specifically, the controller 25 increases the pressure of the suction portion 16*b*. For example, the controller 25 opens the inside of the suction portion 16*b* to the atmosphere. The cylinder 21*a* of the drive mechanism 21 is opened (step S146). The controller 25 determines whether the upper surface of the article A suctioned by the upper surface suction unit 16 is released (step S147). Whether the upper surface is released is determined based on the pressure in the suction portion 16*b*. When the pressure of each of the suction portions 16*b* exceeds a preset threshold, it is determined that the upper surface is released.

Figure 17A:
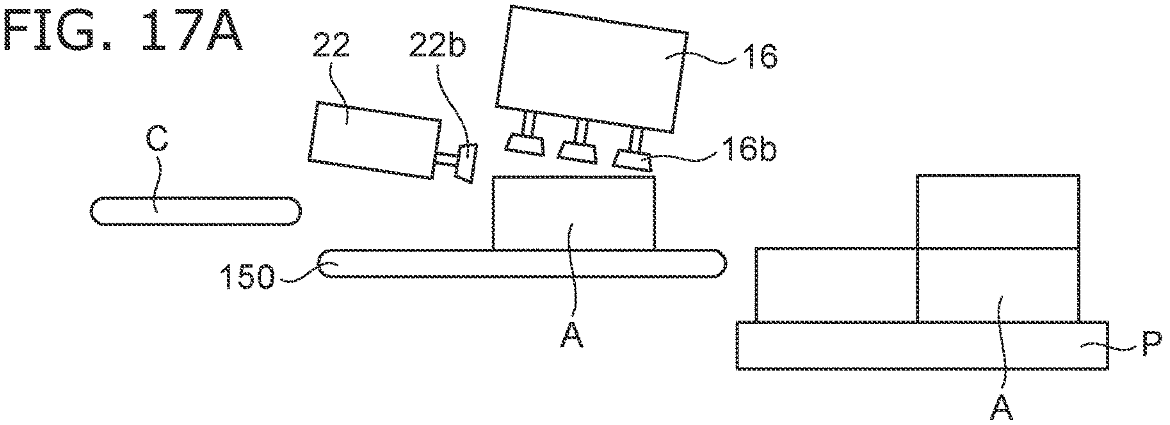
FIGS. 17A to 17C are schematic views showing the first operation.
Figure 17B:
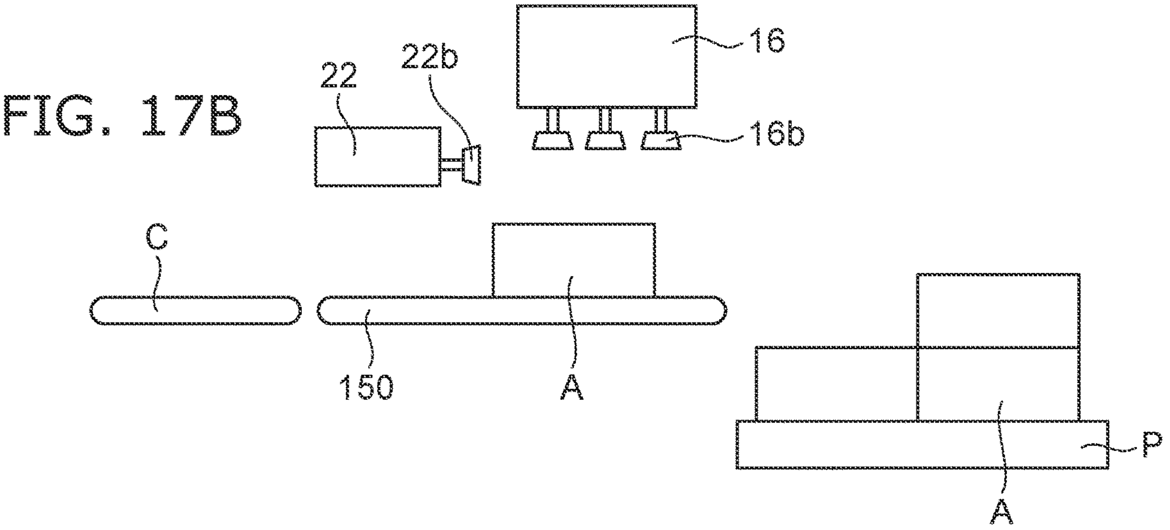
Figure 17C:
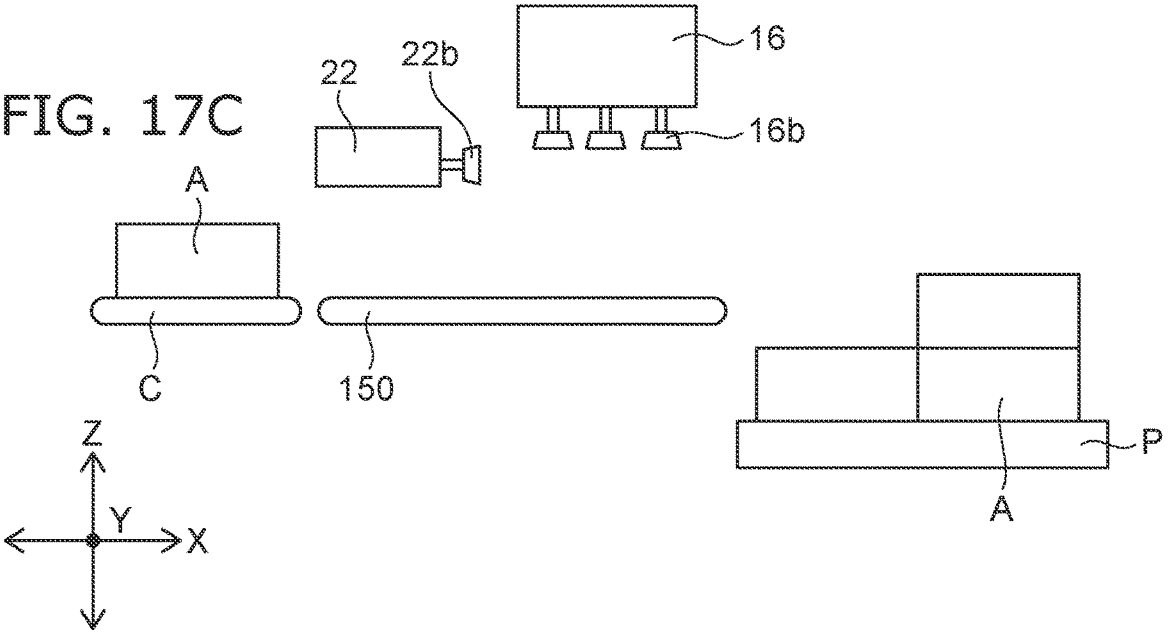

When it is determined that the suctioned upper surface is not released, the controller 25 stands by. When the pressure of each of the suction portions 16*b* increases during the standby, the upper surface is released. In addition, during the standby, the controller 25 determines whether a preset time has elapsed from the end of the suction to the upper surface (step S148). When the upper surface is not released even after the set time has elapsed, the controller 25 ends the first operation. When the upper surface is released, the transferred article A is placed on the conveyor 150 as shown in FIG. 17A. The inclination mechanism 12 operates the cylinder 12*a* so that the suction plane of the upper surface suction unit 16 is horizontal (parallel to the X-Y plane) (step S149). As shown in FIG. 17B, the lifting-and-lowering device 132 lifts the suction hand 1 (step S150). As shown in FIG. 17C, the conveyor 150 conveys the placed article A to the conveyor C (step S151). The conveyor C conveys the article A to another location. According to the above steps, the first operation is finished.

(Second Determination)

Figure 18:
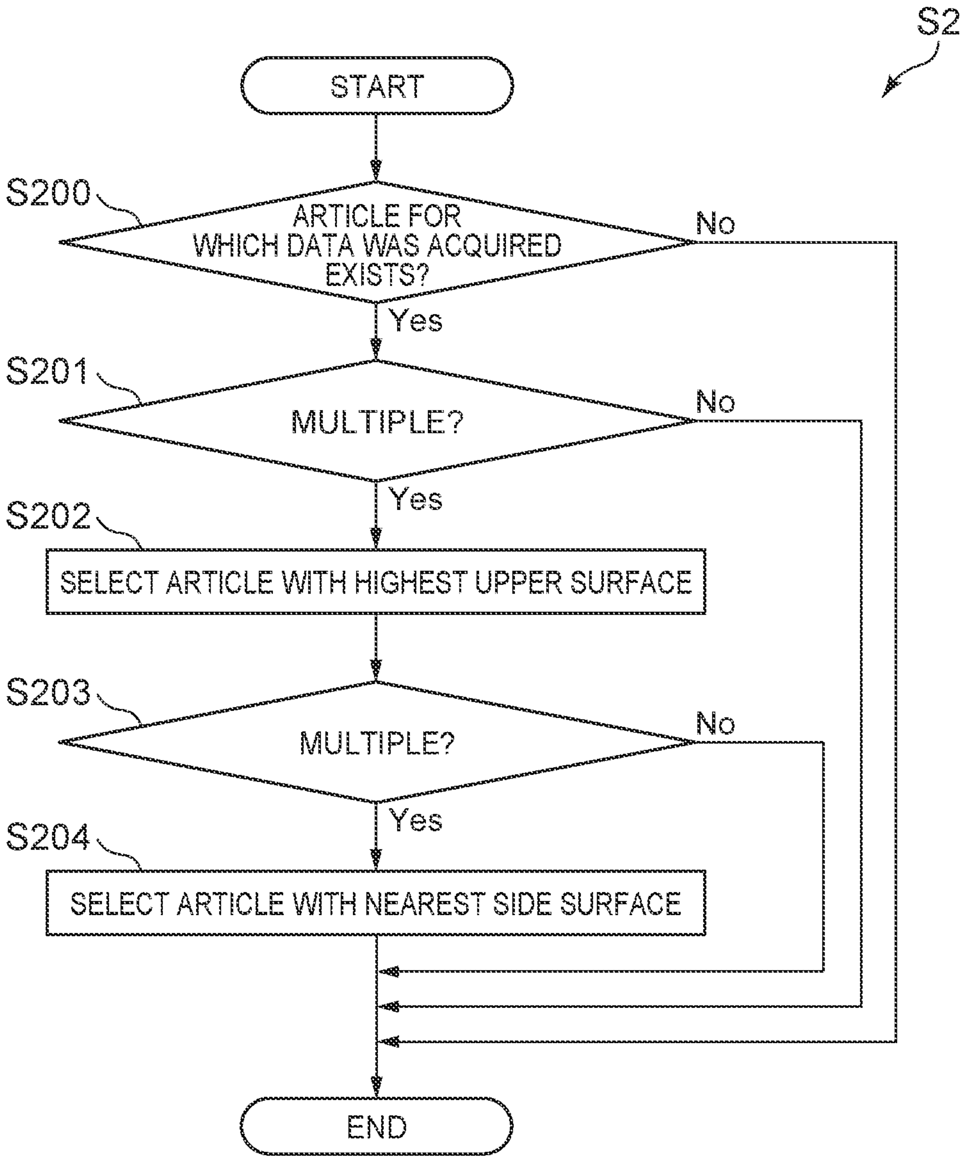
FIG. 18 is a flowchart showing the processing in the second determination.

FIG. 18 is a flowchart showing the processing in the second determination.

First, the controller 25 determines whether there is an article for which data on the upper surface has been acquired (step S200). Next, it is determined whether or not there are multiple articles for which data has been acquired (step S201). In the case where the data on multiple articles have been acquired, the article with the highest upper surface is selected (step S202). It is determined whether a number of the selected articles is two or more (step S203). In the case where multiple articles are selected, the article whose side surface is positioned nearest is selected (step S204).

In the case where it is determined in the step S200 that there is no article for which data has been acquired, the second determination ends without selecting the article to be held. In the case where it is determined in the step S201 that there is only one article for which data has been acquired, the one article is selected as the object to be held. In the step S203, in the case where it is determined that only one article has been selected in the step S202, the one article is finally selected as the object to be held. In the case where there are multiple articles selected in the step S204, an arbitrary one is selected from the selected articles. For example, an article closest to the distance measuring sensor 122*a* is selected from multiple articles. The transfer apparatus 100 moves the selected article by the second operation.

Figure 19:
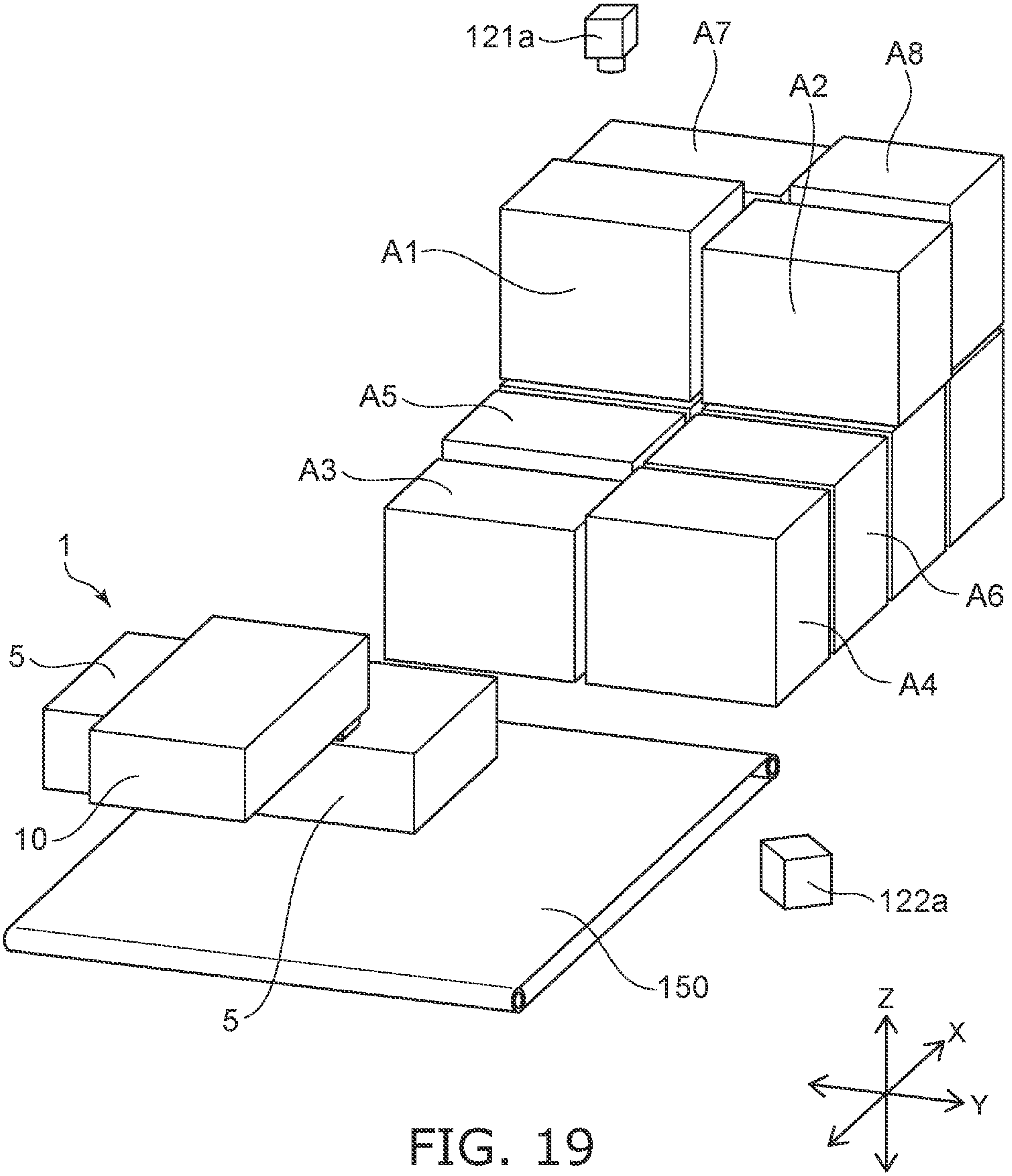
FIG. 19 is a schematic view for explaining the processing in the second determination.

FIG. 19 is a schematic view for explaining the processing in the second determination.

As an example, multiple articles A are loaded as shown in FIG. 19. First, similarly to the example shown in FIG. 12, the articles A1 to A4 are extracted as articles for which data on both the upper surface and the side surface have been obtained based on the detection results of the first detector 121, in the first determination. The detection result by the second detector 122 may be further used. For the set of articles A1 and A2, there is a level difference between the upper surface of article A1 and the upper surface of article A2. For the set of articles A3 and A4, there is a level difference between the upper surface of article A3 and the upper surface of article A4. Therefore, in the step S106 in the first determination, it is determined that there is no set of articles that satisfies the condition.

In the step S200 in the second determination, multiple articles A1 to A8 are extracted as articles for which data on the upper surface has been acquired. In the step S202, the articles A1 and A8 with the highest upper surfaces are selected. Since multiple articles are selected, in step S204, the article A1 whose side surface is nearest is selected as the object to be held by the second operation. After the article A1 is moved by the second operation, the article A8 is selected as the object to be held by the second operation in the following second determination.

As described above, the second condition includes that the upper surface of any article can be detected. The second condition is easier than the first condition. Therefore, even if the first condition is not satisfied, the second condition may be satisfied. Any article that can hold the upper surface is selected by the second determination using the second condition.

(Second Operation)

Figure 20:
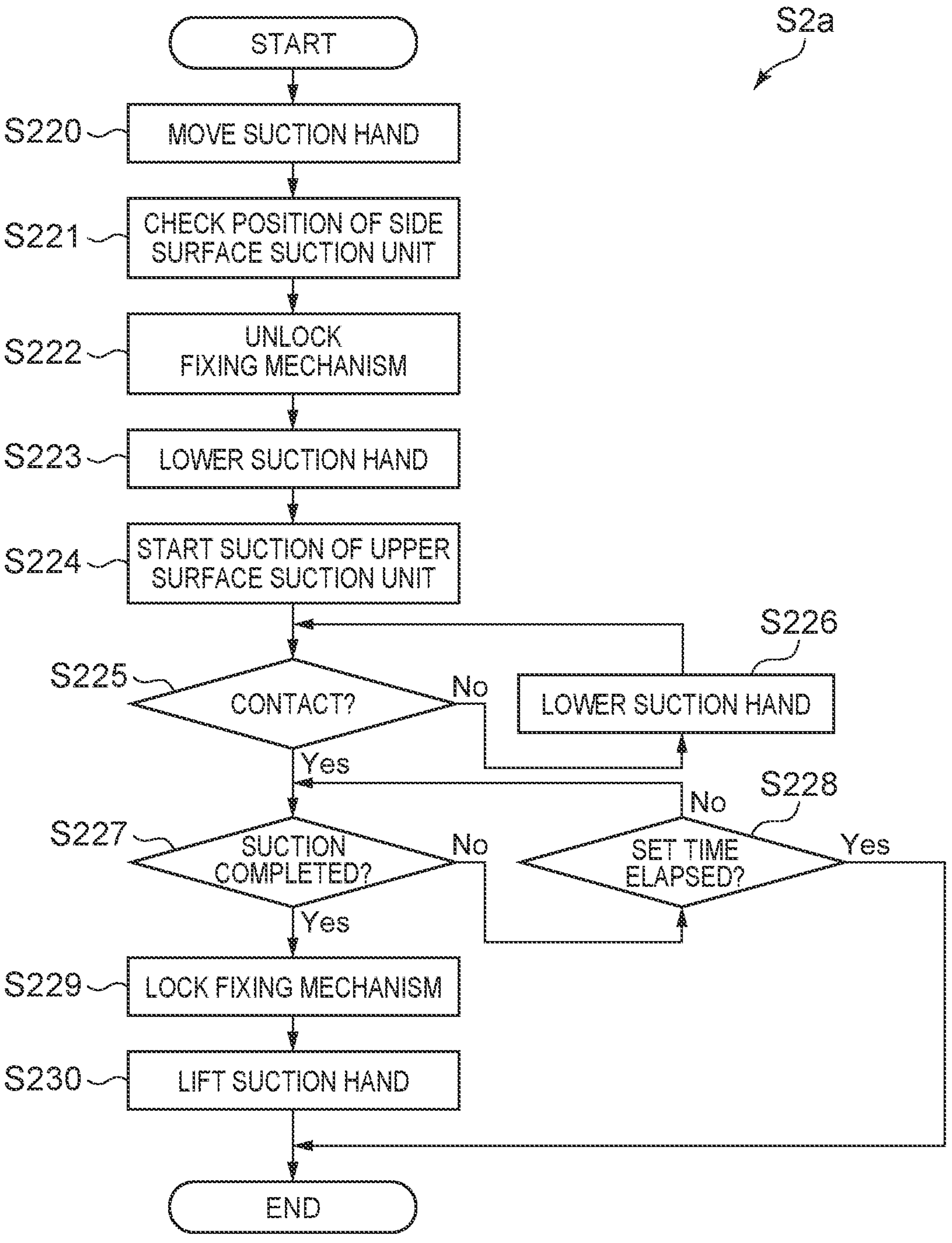
FIG. 20 is a flowchart showing a part of the second operation.
Figure 21:
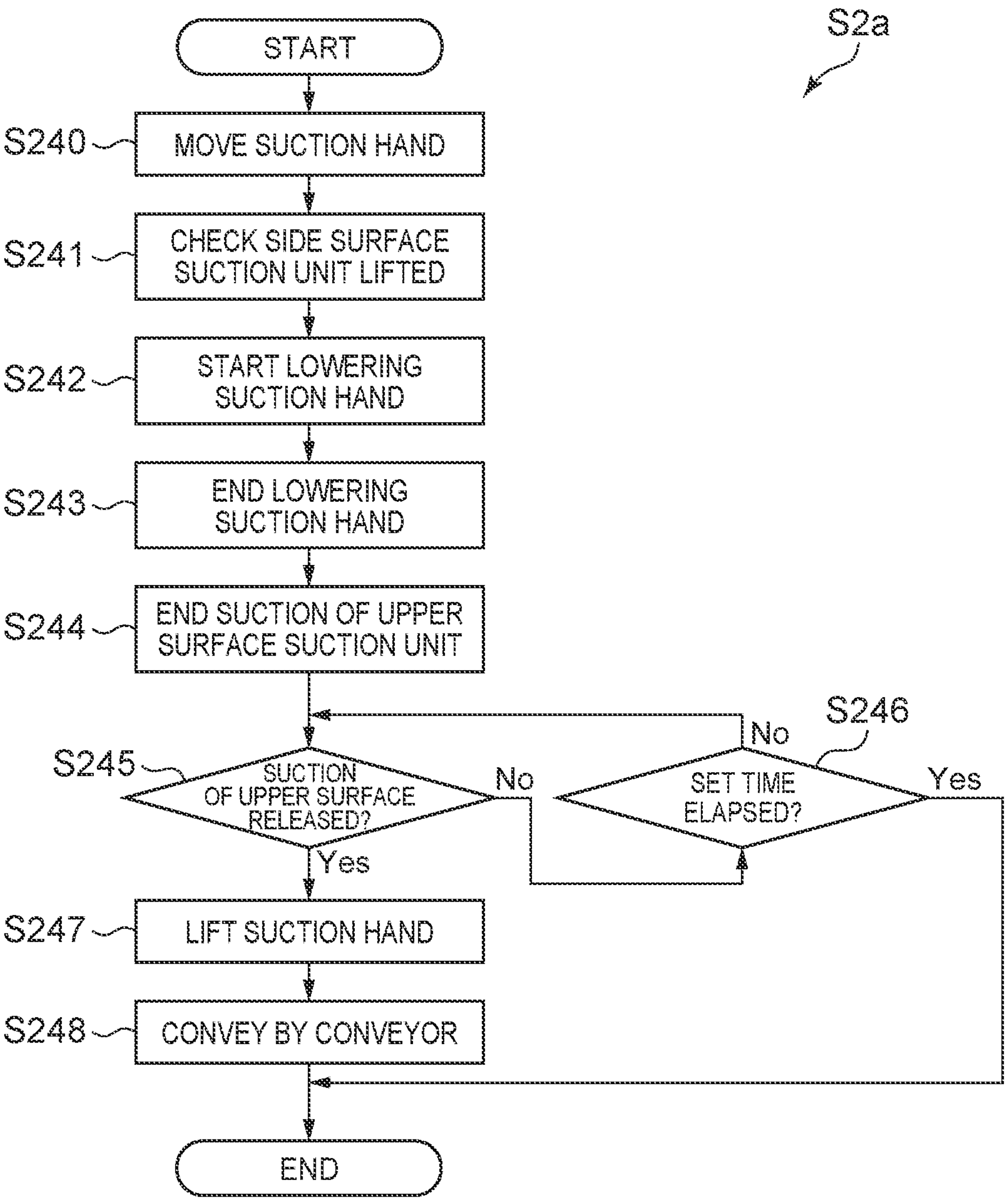
FIG. 21 is a flowchart showing another part of the second operation.

FIG. 20 is a flowchart showing a part of the second operation. FIG. 21 is a flowchart showing another part of the second operation. FIGS. 22A and 22B, FIGS. 23A to 23C, and FIGS. 24A to 24C are schematic views showing the second operation.

Figure 22A:
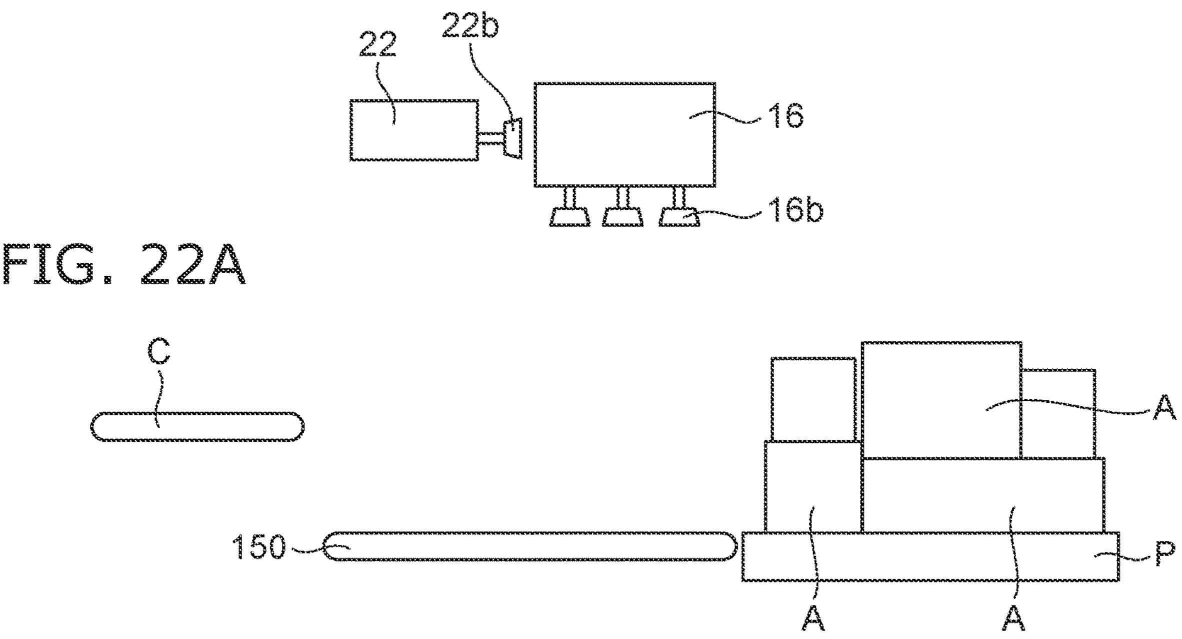
FIGS. 22A and 22B are schematic views showing the second operation.
Figure 22B:
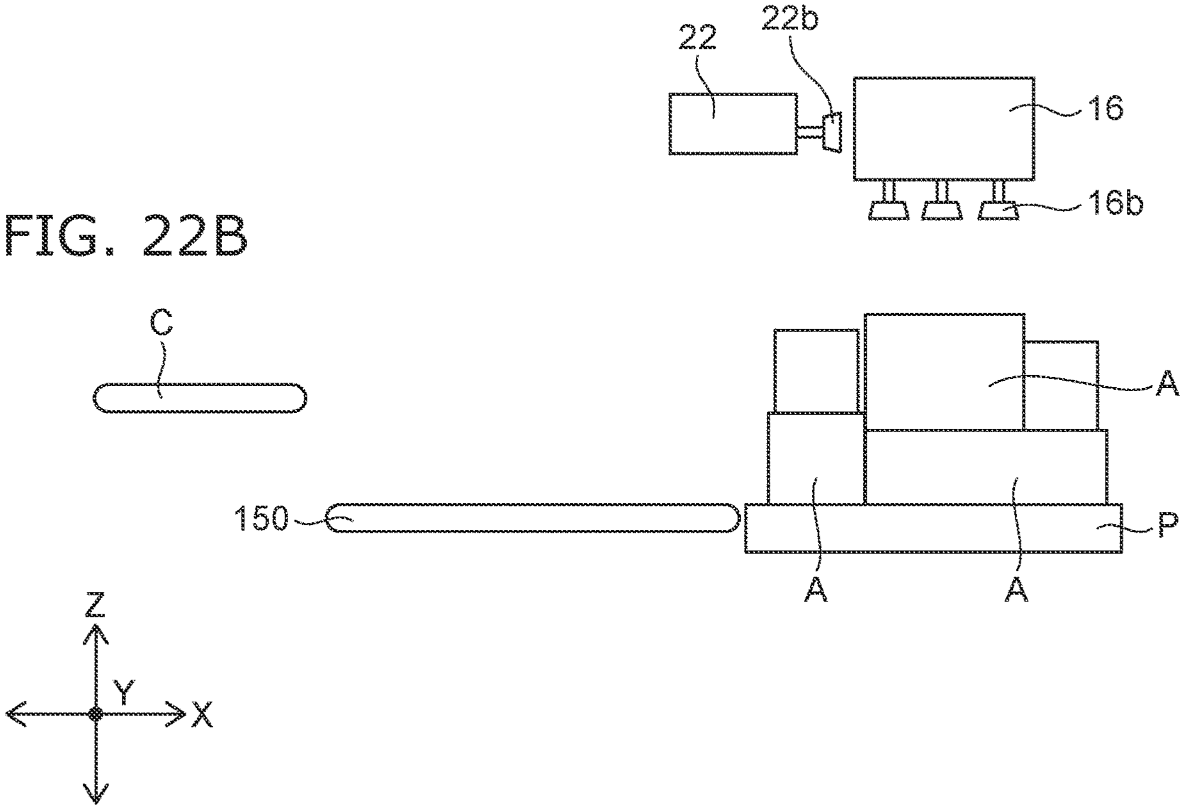

The horizontal moving device 131 moves the suction hand 1 along the X-Y plane (step S220), and positions the suction hand 1 above the article A selected in the second determination, as shown in FIGS. 22A and 22B. The controller 25 checks whether the side surface suction unit 22 is located at the second position (step S221). When the side surface suction unit 22 is not located at the second position, the controller 25 operates the drive mechanism 21 to move the side surface suction unit 22 to the second position.

The fixing mechanism 15 is set to the unlocked state (step S222), and the connection frame 14 is in the movable state.

Figure 23A:
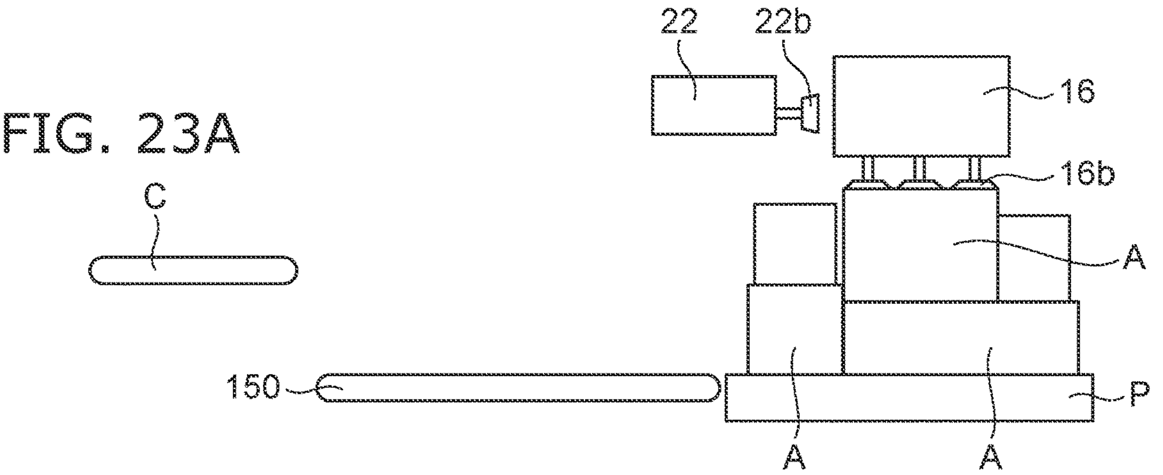
FIGS. 23A to 23C are schematic views showing the second operation.

As shown in FIG. 23A, the lifting-and-lowering device 132 lowers the suction hand 1 toward the article A (step S223). The suction hand 1 is lowered to the position of the upper surface of the selected article A. The upper surface suction unit 16 starts suction of the upper surface of the article A (step S224). Specifically, the controller 25 operates the negative pressure generator 140 to exhaust the inside of the suction portion 16*b*. The controller 25 determines whether the upper surface suction unit 16 is in contact with the article A (step S225). The contact is determined based on the detector 23. When it is determined that the upper surface suction unit 16 is not in contact with the article A, the lifting-and-lowering device 132 lowers the suction hand 1 again (step S226).

When it is determined that the upper surface suction unit 16 is in contact with the article A, the controller 25 determines whether the suction of the article A by the upper surface suction unit 16 is completed (step S227). Similarly to the first operation, whether the suction is completed is determined based on the pressure in the upper surface suction unit 16. When it is determined that the suction is not completed, the suction by the upper surface suction unit 16 is continued. The controller 25 determines whether a preset time has elapsed from the start of the suction (step S228). When the suction is not completed even after the set time has elapsed, the controller 25 ends the second operation.

Figure 23B:
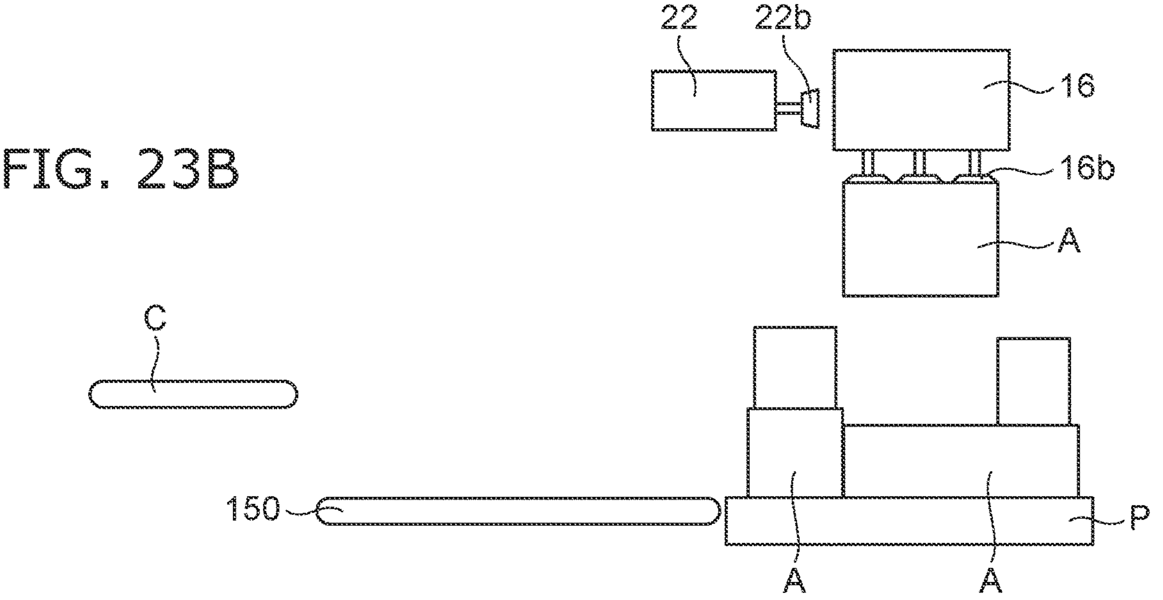
Figure 23C:
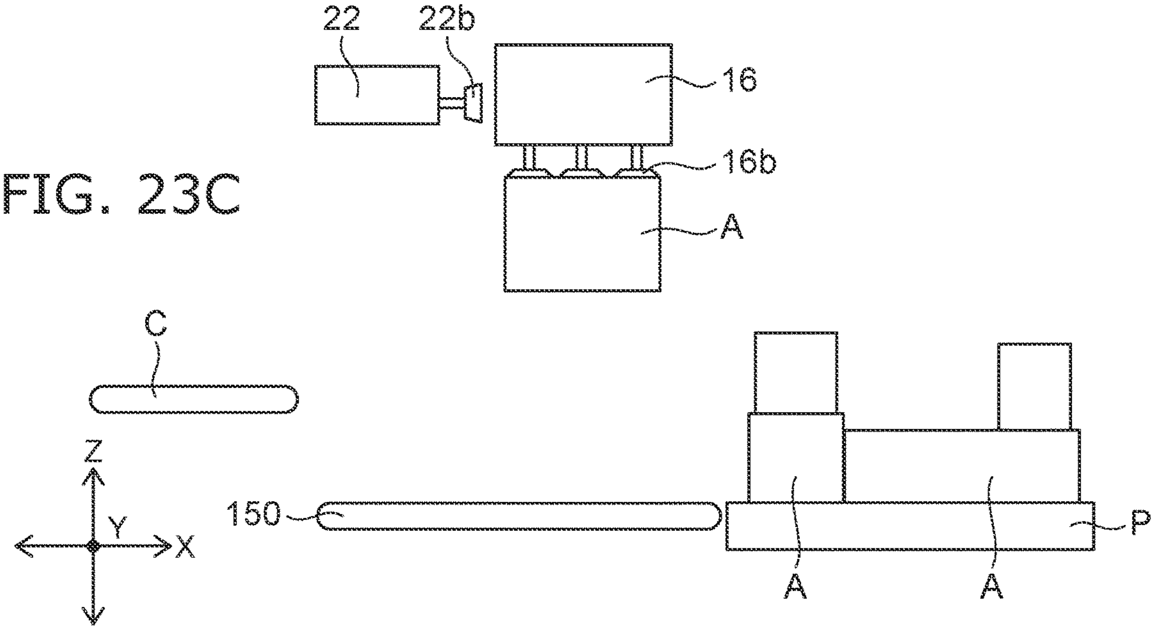

When the suction is completed, the fixing mechanism 15 is set to the locked state (step S229), and the position of the upper surface suction unit 16 in the suction hand 1 is fixed. As shown in FIG. 23B, the lifting-and-lowering device 132 lifts the suction hand 1 (step S230). After the step S230, the horizontal moving device 131 moves the suction hand 1 along the X-Y plane (step S240 in FIG. 21). As shown in FIG. 23C, the held article A is conveyed above the conveyor 150. The controller 25 checks whether the side surface suction unit 22 is located at the second position (step S241). When the side surface suction unit 22 is not located at the second position, the controller 25 operates the drive mechanism 21 to move the side surface suction unit 22 to the second position.

Figure 24A:
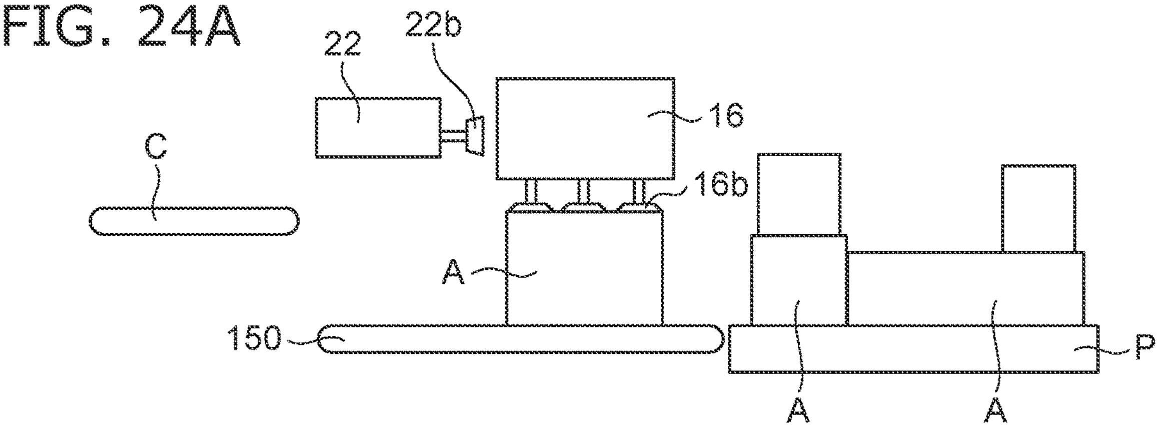
FIGS. 24A to 24C are schematic views showing the second operation.

The lifting-and-lowering device 132 starts to lower the suction hand 1 (step S223). As shown in FIG. 24A, when the position of the bottom surface of the held article A is lowered to a position of an upper surface of the conveyor 150, the lifting-and-lowering device 132 ends the lowering of the suction hand 1 (step S243). The position of the bottom surface of the article A is calculated by the controller 25 based on the detection result of the third detector 123. The upper surface suction unit 16 ends the suction to the upper surface of the article A (step S244). Specifically, the controller 25 increases the pressure of the upper surface suction unit 16. For example, the controller 25 opens the inside of the upper surface suction unit 16 to the atmosphere. The controller 25 determines whether the upper surface of the article A suctioned by the upper surface suction unit 16 is released (step S245). Similarly to the first operation, whether the upper surface is released is determined based on the pressure in the inner space of the upper surface suction unit 16.

Figure 24B:
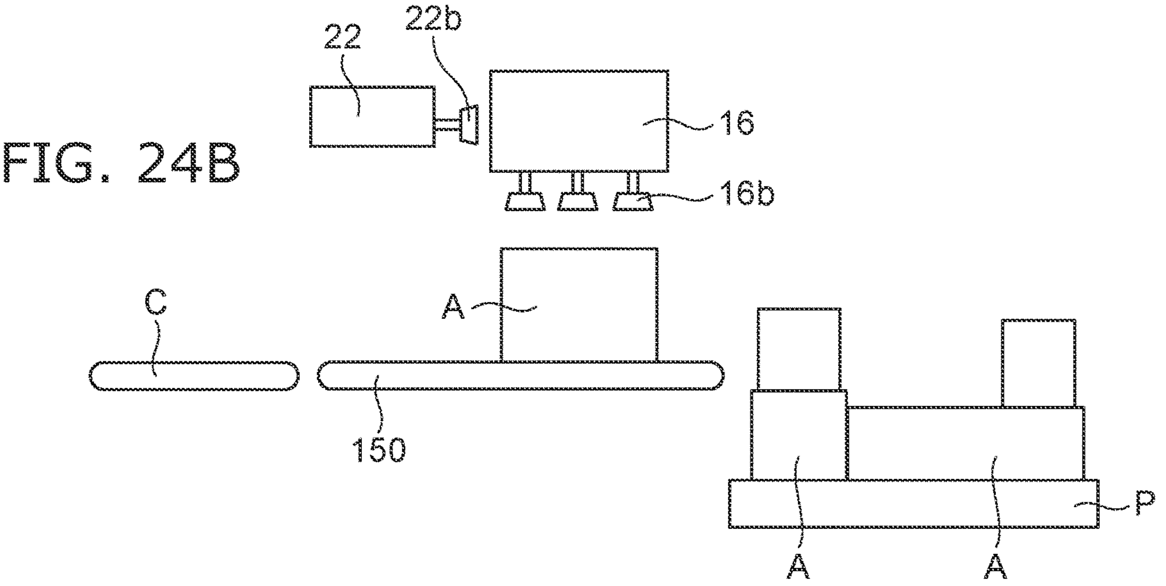
Figure 24C:
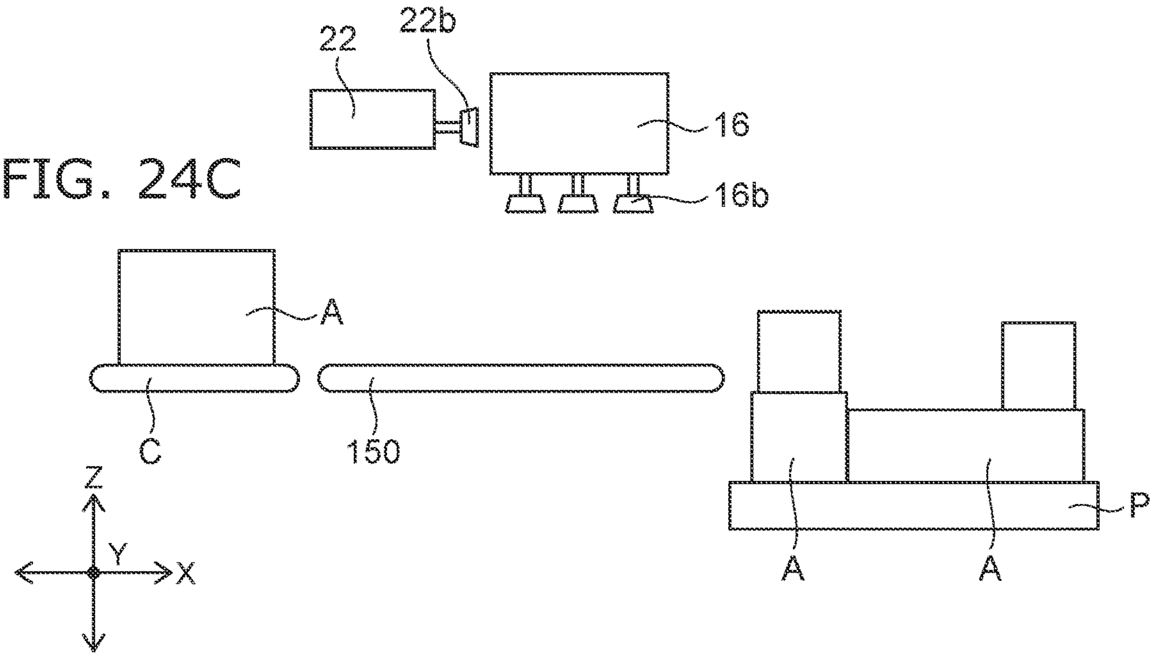

When it is determined that the suctioned upper surface is not released, the controller 25 stands by. When the pressure of each of the suction portions 16*b* increases during the standby, the upper surface is released. In addition, during the standby, the controller 25 determines whether a preset time has elapsed from the end of the suction to the upper surface (step S246). When the upper surface is not released even after the set time has elapsed, the controller 25 ends the second operation. When the upper surface is released, the lifting-and lowering device 132 lifts the suction hand 1 as shown in FIG. 24B (step S247). As shown in FIG. 24C, the conveyor 150 conveys the placed article A to the conveyor C (step S248). The conveyor C conveys article A to another location. According to the above steps, the second operation is finished.

In the above example, the multiple articles are slid in the first operation. The embodiment is not limited to this example. In the first operation, the transfer apparatus 100 may lift the multiple articles after holding similarly to the second operation. Even in this case, both the upper surface and the side surface of the article are held. Thereby, it can prevent large local forces from being applied to the article. For example, the possibility of an article being damaged can be reduced. In the case where multiple articles are lifted in the first operation, the determination in the step S106 may be omitted. The transfer apparatus 100 may switch between sliding and lifting the multiple articles depending on whether the condition is satisfied in the determination of the step S106.

Advantages of the embodiment will be described.

There are various requirements for transfer apparatus for articles. For example, there is a need to improve work efficiency for transfer apparatus. In other words, it is required to be able to transfer more articles in a shorter time. Conventionally, there is an apparatus that suctions the upper surface of one article and transfers the article. Since the transfer apparatus can only transfer articles one by one, the work efficiency is not good. With respect to this problem, there is another apparatus that suctions upper surfaces of multiple articles and transfers them. On the other hand, in transfer of multiple articles by suctioning upper surfaces, the transfer may be unstable, especially when each article is heavy. For example, the suction may be released during transfer and the article may drop. Or, too much load may be applied to the suction hand and the suction hand may be damaged.

To improve transfer stability, there is a transfer apparatus that suctions not only the upper surface but also the side surface. The transfer apparatus suctions the upper and side surfaces of each of the articles and then moves the articles. This prevents the dropping of articles and reduces the load on the suction hand. On the other hand, such transfer apparatus is mainly used when articles of the same size are regularly loaded. Irregularly sized articles make it difficult to hold multiple articles at the same time because the upper surfaces of adjacent articles are in different positions. Or, the path between the transferred article and the transfer destination is not flat, and the article cannot be slid. In this regard, it is conceivable to use different transfer apparatus in different situations, such as when articles of the same size are loaded and when articles of different sizes are loaded. However, according to this method, pallets must be allocated appropriately for each transfer apparatus according to the type of transfer apparatus and the articles to be transferred. This makes management cumbersome. In addition, the operating rate of the transfer apparatus may also decrease.

With respect to these problems, the transfer apparatus 100 according to the embodiment can switch between the first and second operations for transfer. Specifically, when the placement state satisfies the first condition, the upper surfaces of the multiple articles are respectively suctioned by the multiple upper surface suction units 16, and the side surfaces of the multiple articles are respectively suctioned by the multiple side surface suction units 22. Then, the articles are moved in the state where the upper surfaces and side surfaces of the articles are suctioned. When the placement state satisfies the second condition, the upper surface of one article is suctioned by one of the multiple upper surface suction units 16, and the one article is moved. At this time, the side surface suction unit 22 does not suction the article.

According to the first operation, the multiple articles can be moved stably by suctioning both the upper surfaces and the side surfaces of the multiple articles. On the other hand, according to the second operation, even if the movement of multiple articles by the first operation is not feasible, the articles can be moved one by one stably. In addition, by switching the first and second operations depending on the placement state, the articles can be efficiently and stably moved regardless of the size of the articles or how the articles are loaded.

The switching of the first and second operations by the transfer apparatus 100 is based on the placement state of the articles calculated from the detection result by the first detector 121. Thus, for example, it is not necessary to input prior information to switch the first and second operations. Even if a regular arrangement of same-sized articles is unintentionally disrupted, the operation can be switched appropriately. Therefore, transfer can be continued stably and the reliability of the transfer apparatus 100 can be improved.

The placement state is preferably calculated based on the detection result by the second detector 122 in addition to the detection result by the first detector 121. Further use of the detection result by the second detector 122 provides more information than using only the detection result by the first detector 121. Thus, the placement state can be calculated in more detail. As a result, the difference between the placement of the article indicated by the placement state and the actual placement of the article can be reduced.

Preferably, the transfer apparatus 100 can switch between the first state where the side surface suction unit 22 is in the first position and the second state where the side surface suction unit 22 is in the second position. In the first operation, the side surface suction unit 22 is located in the first position where the side surface of the article can be suctioned. In the second operation, the side surface suction unit 22 is located in the second position above the first position. Thus, when the suction hand 1 holds the article A in the second operation, the possibility of the side surface suction unit 22 interfering with the article A which is different from the object to be held can be reduced.

Figure 25:
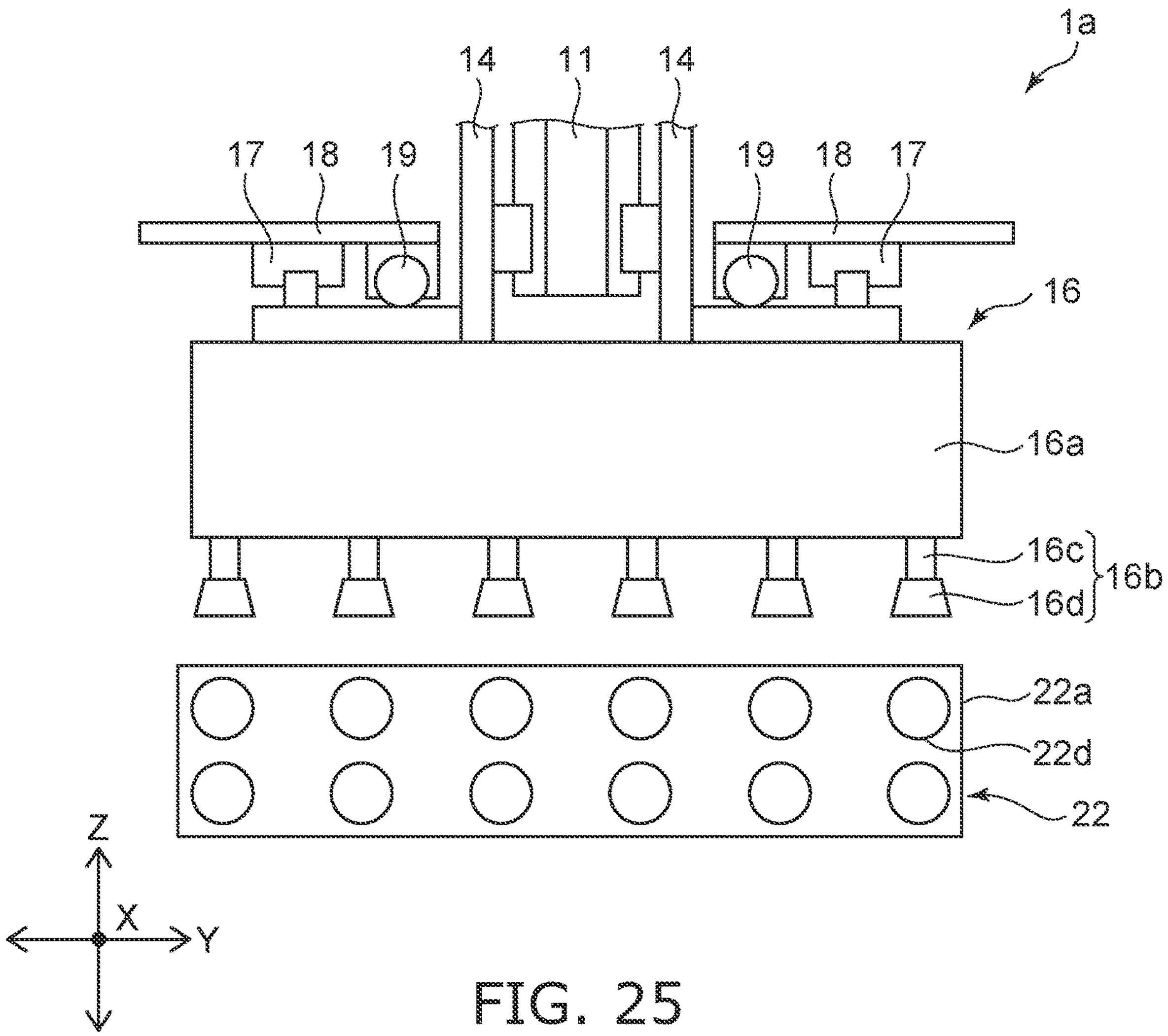
FIG. 25 is a front view schematically showing another suction hand according to the embodiment.

FIG. 25 is a front view schematically showing another suction hand according to the embodiment.

In the examples shown in FIGS. 2 and 4, the multiple upper surface suction units 16 are movable independently of each other, and the multiple side surface suction units 22 are movable independently of each other in the suction hand 1. The suction hand according to the embodiment is not limited to this example. For example, in the suction hand 1*a* shown in FIG. 25, the multiple upper surface suction units 16 are fixed to each other. The multiple side surface suction units 22 are fixed to each other.

Even when the suction hand 1*a* is used, the multiple upper surface suction units 16 can respectively suction the upper surfaces of the multiple articles. The multiple side surface suction units 22 can respectively suction the side surfaces of the multiple articles.

More preferably, the transfer apparatus 100 includes the suction hand 1 shown in FIGS. 2 to 6. When the multiple upper surface suction units 16 are movable independently of each other in the Z-direction, the upper surfaces of the multiple articles can be simultaneously suctioned by the multiple upper surface suction units 16 even if the positions of the upper surfaces of the multiple articles are different from each other. The second threshold in the flowchart shown in FIG. 11 can be larger. The number of cases in which multiple articles can be held at the same time increases, and it improves the efficiency of transfer.

Similarly, when the multiple side surface suction units 22 are movable independently of each other in the X-direction, the side surfaces of the multiple articles can be simultaneously suctioned by the multiple side surface suction units 22 even when the positions of the side surfaces of the multiple articles are different from each other. The fourth threshold in the flowchart shown in FIG. 11 can be larger. The number of cases in which multiple articles can be held at the same time increases, and it improves the efficiency of transfer.

(Variation)

The transfer apparatus 100 may be capable of performing a third operation in addition to the first and second operations. The third operation differs from the first and second operations in terms of the number of articles to be held, the method of holding, or the method of transfer.

Figure 26A:
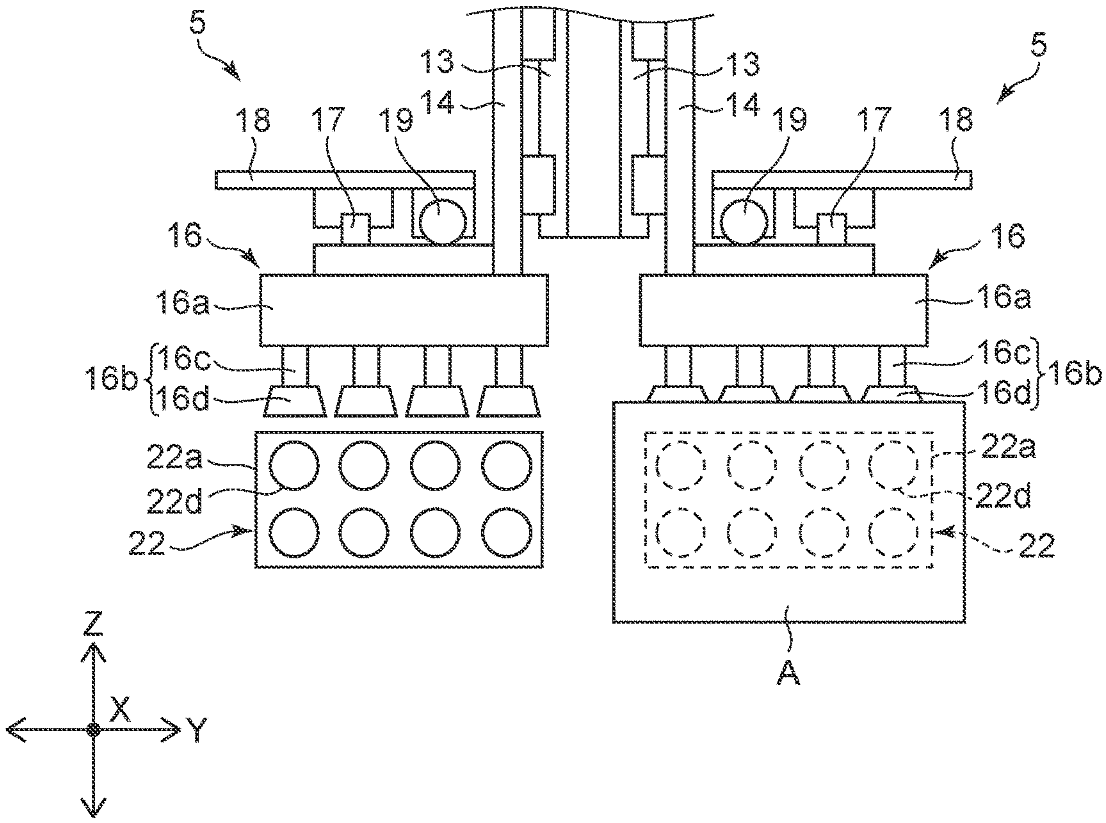
FIG. 26A is a front view schematically showing the holding method in the third operation.
Figure 26B:
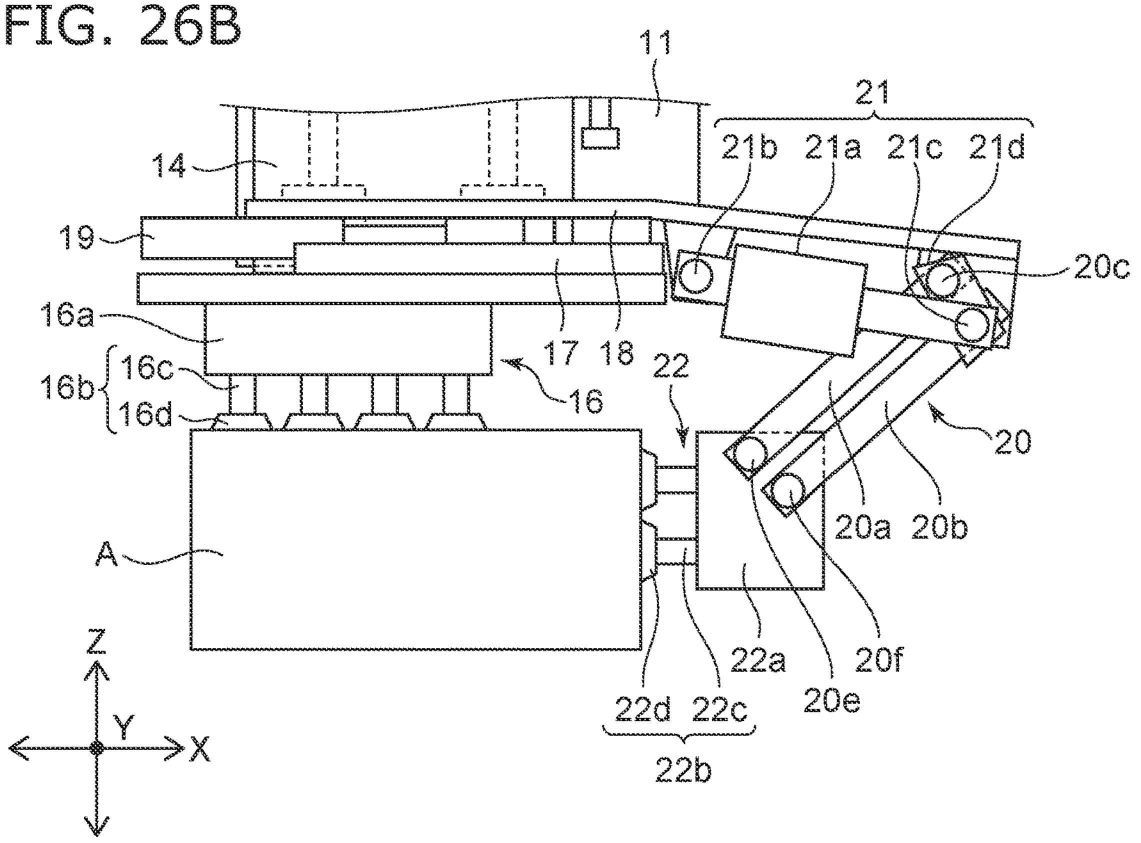
FIG. 26B is a side view schematically showing the holding method in the third operation.

FIG. 26A is a front view schematically showing the holding method in the third operation. FIG. 26B is a side view schematically showing the holding method in the third operation.

As shown in FIG. 26A and FIG. 26B, in the third operation, one article A is held by the suction hand 1. In the example of FIG. 26A, the upper surface and the side surface of one article A are respectively suctioned by the upper surface suction unit 16 and the side surface suction unit 22 of one suction mechanism 5. Depending on the size of the article, the upper surface and the side surface of one article A may be suctioned by the multiple upper surface suction units 16 and the multiple side surface suction units 22. The transfer apparatus 100 moves the one held article A by sliding on the upper surface of the pallet P or the upper surface of the other article A. According to the third operation, since the upper surface and the side surface of the article A can be suctioned, the article A can be moved more stably than in the second operation. In addition, by sliding the article A in the third operation, it is not necessary to lift the article A significantly. The transfer time can be shortened compared with the second operation.

Figure 27:
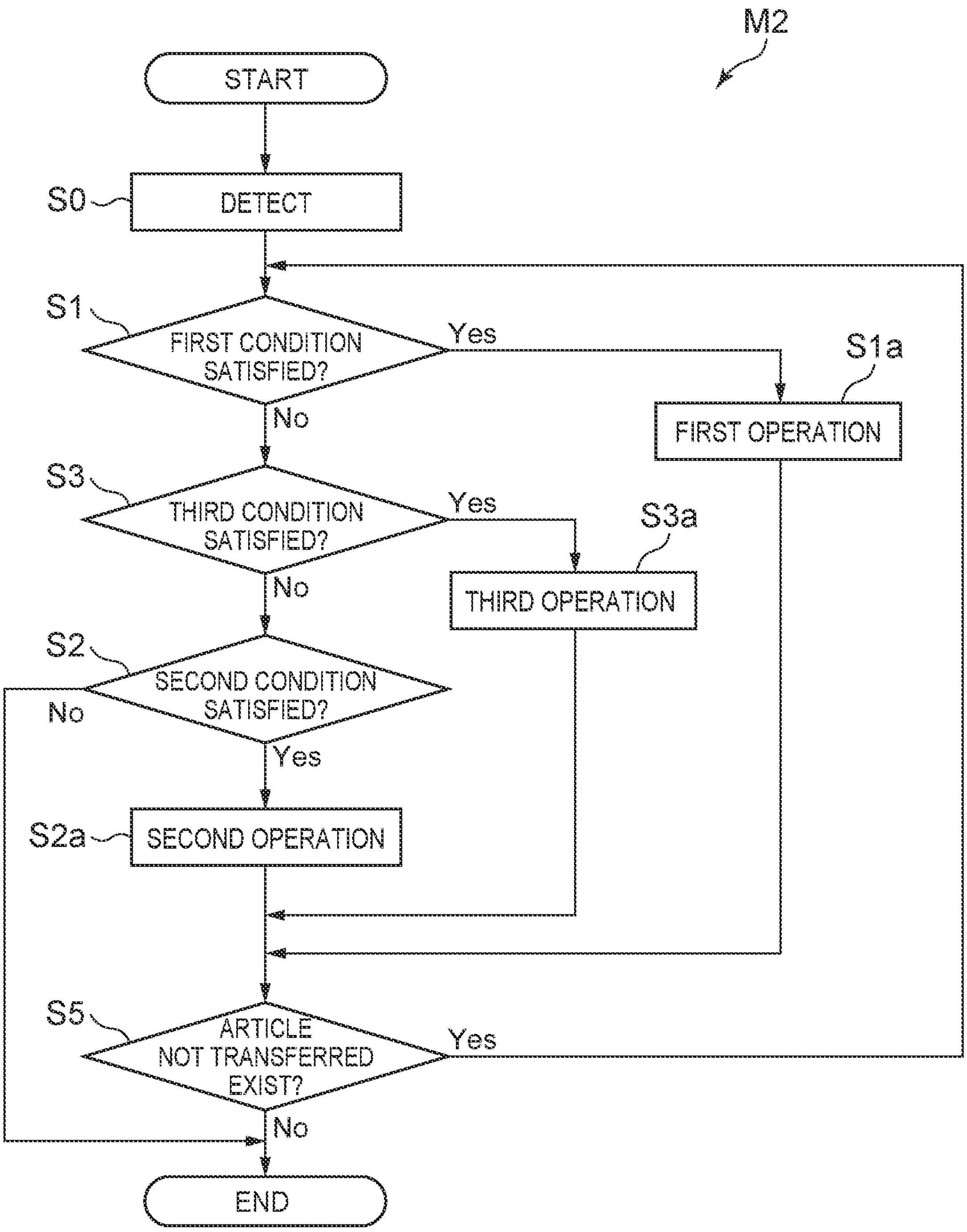
FIG. 27 is a flow chart showing the outline of the transfer method by the transfer apparatus according to the variation of the embodiment.

FIG. 27 is a flow chart showing the outline of the transfer method by the transfer apparatus according to the variation of the embodiment.

A transfer method M2 shown in FIG. 27 further includes steps S3 and S3*a* compared to the transfer method M1 shown in FIG. 10. The controller 25 executes the step S1 in the same manner as the transfer method M1. In the case where the first condition is not satisfied, the controller 25 determines whether the placement state satisfies the third condition (step S3: third determination). In the case where the third condition is satisfied, the controller 25 performs the third operation (step S3*a*). In the case where the third condition is not satisfied, the controller 25 determines whether the placement state satisfies the second condition (step S2). Thereafter, the same steps as the transfer method M1 are executed.

(Third Determination)

Figure 28:
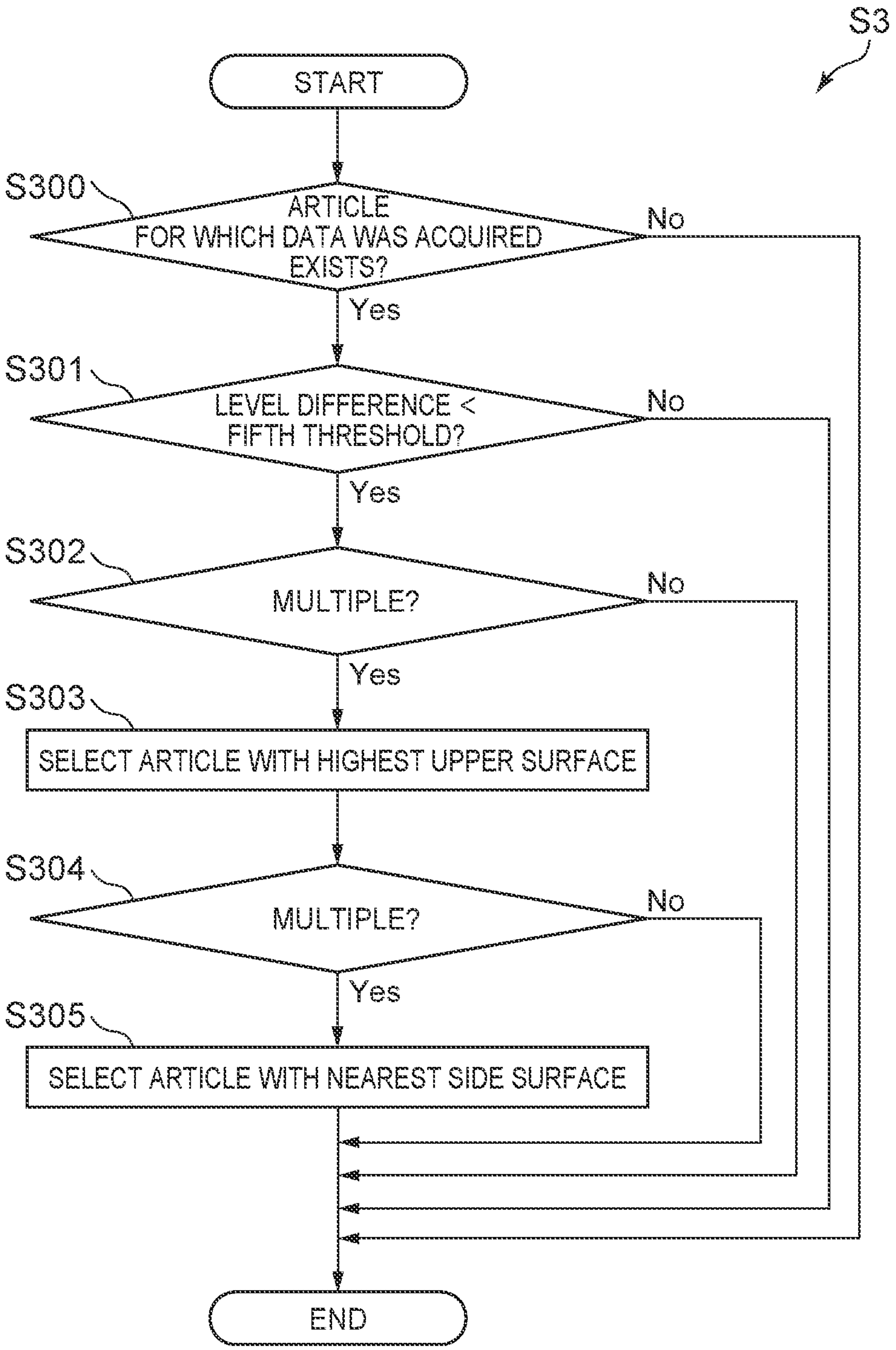
FIG. 28 is a flowchart showing the processing in the third determination.

FIG. 28 is a flowchart showing the processing in the third determination.

First, the controller 25 determines whether there is an article for which data on the upper surface and side surface have been acquired (step S300). In the case where there is an article for which data have been acquired, the controller

25 determines whether the level difference in the movement path of the article is less than the fifth threshold (step S301). The movement path is the upper surface of the other article or the upper surface of the pallet P, as in the first operation. In the case where the level difference is less than the fifth threshold, the controller 25 determines whether there is more than one article satisfying the condition of step S301 (step S302). In the case where multiple articles satisfy the condition of step S301, the controller 25 selects the article whose upper surface is in the highest position (step S303). The controller 25 determines whether there are multiple selected articles (step S304). In the case where multiple articles are selected, the controller 25 selects the article whose side is nearest to the front (step S305). If there are multiple articles selected in the step S305, any one of the selected articles is selected. For example, the article closest to the distance measuring sensor 122*a* is selected from the multiple articles. The transfer apparatus 100 moves the selected article by the third operation.

Figure 29:
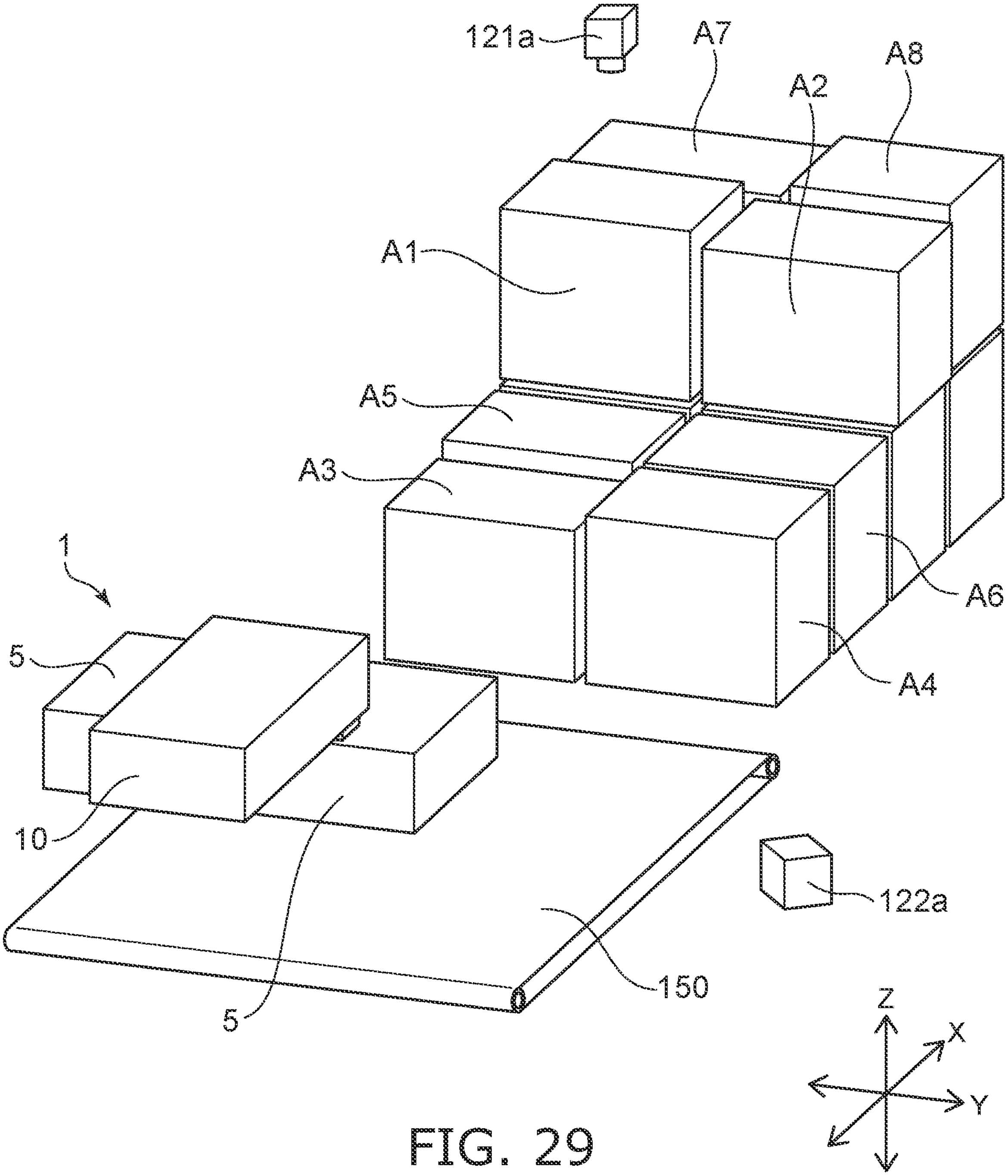
FIG. 29 is a schematic view for explaining the processing in the third determination.

FIG. 29 is a schematic view for explaining the processing in the third determination.

As an example, multiple articles A are loaded as shown in FIG. 29. In the first determination, it is determined that there is no set of articles satisfying the conditions, similarly to the example shown in FIG. 19. In the third determination, articles A1 to A4 are extracted as the articles from which data on the upper surface and the side surface have been acquired.

In the step S301, the upper surface of the article A3 and the upper surface of the article A5 are determined as the movement path of the article A1. The upper surface of the article A4 and the upper surface of the article A6 are determined to be the movement path of the article A2. A level difference exists between the upper surface of the article A3 and the upper surface of the article A5. For example, the level difference in the movement path is determined to be not less than the fifth threshold. On the other hand, there is no level difference between the upper surface of the article A4 and the upper surface of the article A6. The level difference in the movement path is determined to be less than the fifth threshold. There is also no article between the article A3 and the conveyor 150 or between the article A4 and the conveyor 150. Therefore, the level difference in the respective movement paths of the articles A3 and A4 is determined to be less than the fifth threshold. As a result, it is determined that the multiple articles A2 to A4 satisfy the condition of the step S301.

In the step S303, the article A2 with the upper surface at the highest position is selected from the multiple articles A2 to A4. Thus, the article A2 is selected as the object to be held by the third operation. After the article A2 is transferred by the third operation, the article A4 is selected as the object to be held by the third operation in the next third determination.

As described above, the third condition for the third operation includes being able to acquire data on upper and side surfaces and being able to slide the article A along the X-direction. The third determination using the third condition selects one article that can be moved stably.

Only a part of the conditions described above may be used in the third determination. Relaxing the conditions increases the number of cases in which the upper and side surfaces of the article can be simultaneously held, although the stability of holding or transfer can be reduced. The transfer stability may be improved compared to when the second operation is performed.

The third operation is substantially the same as the first operation except that the number of articles held is different. In the third operation, the same operation as in FIGS. 13 to 17 is performed for one article.

Not limited to the example described above, the transfer apparatus 100 may lift the article after holding it in the third operation, similarly to the second operation. Even in this case, both the upper surface and the side surface of the article are held, and it prevents large local forces from being applied to the article. For example, the possibility of the article being damaged can be reduced. In the case where the article is lifted in the third operation, the determination in step S301 may be omitted. The transfer apparatus 100 may switch between sliding and lifting the article depending on whether the condition is satisfied in the determination of the step S301.

According to the variation, a third operation can be performed even if the first operation is not feasible. By performing the third operation, the stability of the movement of the article can be improved.

Figure 30:
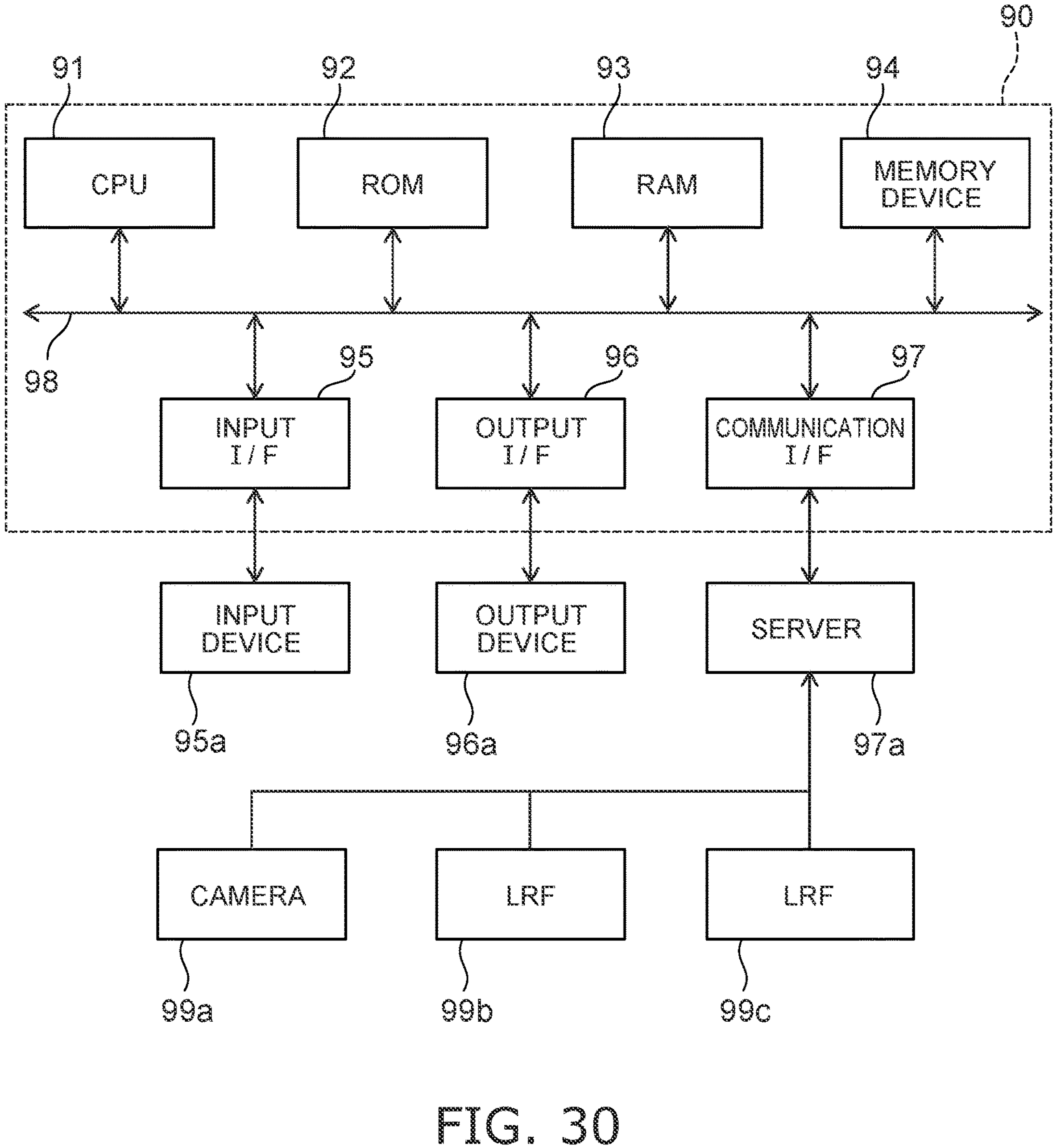
FIG. 30 is a schematic view showing a hardware configuration.

FIG. 30 is a schematic view showing a hardware configuration.

The controller 25 includes, for example, the hardware configuration shown in FIG. 30. A processing device 90 shown in FIG. 30 includes a CPU 91, a ROM 92, a RAM 93, a memory device 94, an input interface 95, an output interface 96, and a communication interface 97.

The ROM 92 stores a program configured to control an operation of a computer. The ROM 92 stores a program necessary for the computer to implement the above-described processes. The RAM 93 functions as a memory area onto which the program stored in the ROM 92 is loaded.

The CPU 91 includes a processing circuit. The CPU 91 executes a program stored in at least one of the ROM 92 and the memory device 94 using the RAM 93 as a work memory. During the execution of the program, the CPU 91 controls each configuration via a system bus 98 to execute various processes.

The memory device 94 stores data necessary for the execution of the program and data obtained by the execution of the program.

The input interface (I/F) 95 connects the processing device 90 and an input device 95*a*. The input I/F 95 is, for example, a serial bus interface such as a USB. The CPU 91 can read various types of data from the input device 95*a* via the input I/F 95.

The output interface (I/F) 96 connects the processing device 90 and an output device 96*a*. The output I/F 96 is, for example, a video output interface such as a digital visual interface (DVI) or a high-definition multimedia interface (HDMI (registered trademark)). The CPU 91 can transmit data to the output device 96*a* via the output I/F 96 and cause the output device 96*a* to display an image.

The communication interface (I/F) 97 connects a server 97*a* outside the processing device 90 to the processing device 90. The communication I/F 97 is, for example, a network card such as a LAN card. The CPU 91 can read various types of data from the server 97*a* via the communication I/F 97. A camera 99*a* captures an image of the article and stores the image in the server 97*a*. The camera 99*a* functions as the imager 121*a*. LRFs 99*b* and 99*c* measure the distance and store the measurement results in the server 97*a*. LRFs 99*b* and 99*c* function as distance measuring sensors 122*a* and 123*a*, respectively.

The memory device 94 includes one or more selected from a hard disk drive (HDD) and a solid state drive (SSD). The input device 95*a* includes one or more selected from a mouse, a keyboard, a microphone (voice input), and a touch pad. The output device 96*a* includes one or more selected from a monitor and a projector. A device having functions of both the input device 95*a* and the output device 96*a*, such as a touch panel, may be used.

Processes of the various types of data described above may be recorded on a magnetic disk (a flexible disk, a hard disk, or the like), an optical disk (CD-ROM, CD-R, CD-RW, DVD-ROM, DVD±R, DVD±RW, or the like), a semiconductor memory, or another non-transitory computer-readable recording medium as the program that can be executed by the computer.

For example, information recorded in the recording medium can be read by the computer (or an embedded system). In the recording medium, a recording format (storage format) is set as desired. For example, the computer reads the program from the recording medium and causes the CPU to execute instructions described in the program based on the program. In the computer, acquisition (or reading) of the program may be performed through a network.

According to the embodiment described above, the transfer apparatus, the controller (control device), the transfer method, the program, and the storage medium capable of efficiently and stably moving articles are provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention. The above embodiments can be practiced in combination with each other.

What is claimed is:

1. A transfer apparatus, comprising:

a suction hand including a plurality of suction mechanisms, each of the suction mechanisms including:

a first suction unit including a plurality of first suction portions and being configured to contact with an article in a first direction, and a second suction unit including a plurality of second suction portions and being configured to contact with the article in a second direction crossing the first direction, the suction mechanisms being provided in a third direction crossing a first plane parallel to the first direction and the second direction;

each of the first suction units being independently movable in the first direction, each of the second suction units being independently movable in the second direction;

a moving device moving the suction hand;

a first detector detecting a first surface and a second surface of the article, the first surface crossing the first direction, the second surface crossing the second direction; and a controller controlling the suction hand and the moving device based on a first detection result from the first detector, the controller performing at least a first operation of causing a plurality of the first suction units to respectively suction a plurality of the first surfaces of a plurality of the articles, causing a plurality of the second suction units to respectively suction a plurality of the second surfaces of the articles, and moving the articles, in a case where a placement state of the articles calculated using the first detection result satisfies a first condition, and a second operation of causing one of the first suction units to suction the first surface of one of the articles, not causing the second suction units to suction the articles, and moving the one of the articles, in a case where the placement state satisfies a second condition.

2. The transfer apparatus according to claim 1, further comprising a second detector detecting the second surface of the article, the second surface crossing the second direction, the placement state calculated based on a second detection result from the second detector in addition to the first detection result.

3. The transfer apparatus according to claim 1, wherein the controller further performs a third operation of causing one of the first suction units to suction the first surface of one of the articles, causing one of the second suction units to suction the second surface of the one of the articles, and moving the one of the articles, in a case where the placement state satisfies a third condition.

4. The transfer apparatus according to claim 3, wherein the controller performs a first determination of determining whether the placement state satisfies the first condition, a second determination of determining whether the placement state satisfies the second condition, and a third determination of determining whether the placement state satisfies the third condition, the third determination is performed after the first determination, and the second determination is performed after the third determination.

5. The transfer apparatus according to claim 4, wherein the first condition includes at least one selected from that the first surfaces of the articles can be simultaneously suctioned by the first suction units, the second surfaces of the articles can be simultaneously suctioned by the second suction units, and the articles can be simultaneously slid along the second direction.

6. The transfer apparatus according to claim 5, wherein the second condition includes that the first surface of the one of the articles can be detected.

7. The transfer apparatus according to claim 5, wherein the third condition includes at least one selected from that the first surface and the second surface of the one of the articles can be detected, and the one of the articles can be slid along the second direction.

8. The transfer apparatus according to claim 1, wherein the controller arranges the second suction units at a first position when performing the first operation, and arranges the second suction units at a second position higher than the first position when performing the second operation.

9. The transfer apparatus according to claim 1, wherein in the first operation, the controller slides the articles along the second direction, and in the second operation, the controller lifts and moves the one of the articles.

10. The transfer apparatus according to claim 1, wherein each of the first suction portions includes a first rod extending along the first direction, and a first suction pad provided at a tip of the first rod.

11. The transfer apparatus according to claim 1, wherein each of the second suction portions includes
a second rod extending along the second direction, and
a second suction pad provided at a tip of the second rod.

12. The transfer apparatus according to claim 1, further comprising a conveyor,
one or more of the articles held by the suction hand being placed on the conveyor,
the conveyor moving the one or more of the articles placed thereon.

13. The transfer apparatus according to claim 12, wherein the conveyor conveys the placed one or more articles to a carrier device provided adjacent to the conveyor.

14. The transfer apparatus according to claim 12, further comprising
a lifting-and-lowering device that moves the conveyor along the first direction.

15. A control device controlling a suction hand and a moving device,
the suction hand including a plurality of suction mechanisms, each of the suction mechanisms including:
a first suction unit including a plurality of first suction portions and contacting with an article in a first direction, and
a second suction unit including a plurality of second suction portions and contacting the article in a second direction crossing the first direction,
the suction mechanisms being provided in a third direction crossing a first plane parallel to the first direction and the second direction,
each of the first suction units being independently movable in the first direction,
each of the second suction units being independently movable in the second direction,
the moving device moving the suction hand,
the control device controlling the suction hand and the moving device based on a first detection result from a first detector, the first detector detecting a first surface and a second surface of the article, the first surface crossing the first direction, the second surface crossing the second direction,
the control device performing at least
a first operation of causing a plurality of the first suction units to respectively suction a plurality of the first surfaces of a plurality of the articles, causing a plurality of the second suction units to respectively suction a plurality of the second surfaces of the articles, and moving the articles, in a case where a placement state of the articles calculated using the first detection result satisfies a first condition, and
a second operation of causing one of the first suction units to suction the first surface of one of the articles, not causing the second suction units to suction the articles, and moving the one of the articles, in a case where the placement state satisfies a second condition.

16. A transfer method for transferring an article, comprising
using a suction hand and a moving device to perform at least a first operation and a second operation,
the suction hand including a plurality of suction mechanisms, each of the suction mechanisms including:
a first suction unit including a plurality of first suction portions and contacting with the article in a first direction, and
a second suction unit including a plurality of second suction portions and contacting the article in a second direction crossing the first direction,
the suction mechanisms being provided in a third direction crossing a first plane parallel to the first direction and the second direction,
each of the first suction units being independently movable in the first direction,
each of the second suction units being independently movable in the second direction,
the moving device moving the suction hand,
the first operation being performed in a case where a placement state of the article calculated using a first detection result from a first detector satisfies a first condition, the first detector detecting a first surface and a second surface of the article, the first surface crossing the first direction, the second surface crossing the second direction,
in the first operation, the first suction units respectively suctioning a plurality of the first surfaces of a plurality of the articles, a plurality of the second suction units respectively suctioning a plurality of the second surfaces of the articles, and the articles being moved,
the second operation being performed in a case where the placement state satisfies a second condition,
in the second operation, one of the first suction units suctioning the first surface of one of the articles, the second suction units not suctioning the articles, and the one of the articles being moved.

17. A non-transitory computer-readable storage medium storing a program, the program causing a processing device to control a suction hand and a moving device,
the suction hand including a plurality of suction mechanisms, each of the suction mechanisms including:
a first suction unit including a plurality of first suction portions and contacting with an article in a first direction, and
a second suction unit including a plurality of second suction portions and contacting the article in a second direction crossing the first direction,
the suction mechanisms being provided in a third direction crossing a first plane parallel to the first direction and the second direction,
each of the first suction units being independently movable in the first direction,
each of the second suction units being independently movable in the second direction,
the moving device moving the suction hand,
the program causing the processing device to control the suction hand and the moving device based on a first detection result from a first detector, the first detector detecting a first surface and a second surface of the article, the first surface crossing the first direction, the second surface crossing the second direction,
the program causing the processing device to perform at least
a first operation of causing a plurality of the first suction units to respectively suction a plurality of the first surfaces of a plurality of the articles, causing a plurality of the second suction units to suction a plurality of the second surfaces of the articles, and moving the articles, in a case where a placement state of the articles calculated using the first detection result satisfies a first condition, and
a second operation of causing one of the first suction units to suction the first surface of one of the articles, not causing the second suction units to suction the articles, and moving the one of the articles, in a case where the placement state satisfies a second condition.

* * * * *